(12) United States Patent
Patrick et al.

(10) Patent No.: US 11,840,279 B2
(45) Date of Patent: Dec. 12, 2023

(54) SECONDARY RETENTION DEVICES FOR RETAINING A HEAVY EQUIPMENT CAB ON A FRAME

(71) Applicants: ZOOMLION Heavy Industry NA, Inc., Yorkville, WI (US); ZOOMLION Heavy Industry Science and Technology Co. Ltd., Changsha Hunan Province (CN)

(72) Inventors: Shawn Patrick, Plainfield, IL (US); Steven Melotik, Kenosha, WI (US); Mark McKinley, Wauwatosa, WI (US)

(73) Assignees: ZOOMLION HEAVY INDUSTRY NA, INC., Yorkville, WI (US); ZOOMLION HEAVY INDUSTRY SCIENCE AND TECHNOLOGY CO. LTD, Changsha Hunan Province (CN)

( * ) Notice: Subject to any disclaimer, the term of this patent is extended or adjusted under 35 U.S.C. 154(b) by 209 days.

(21) Appl. No.: 17/518,626

(22) Filed: Nov. 4, 2021

(65) Prior Publication Data

US 2023/0137036 A1 May 4, 2023

(51) Int. Cl.
*B62D 24/02* (2006.01)
*B62D 33/06* (2006.01)

(52) U.S. Cl.
CPC ......... *B62D 24/02* (2013.01); *B62D 33/0604* (2013.01)

(58) Field of Classification Search
CPC .... B62D 24/02; B62D 33/06; B62D 33/0604; B62D 33/0617; B62D 33/071; B62D 33/077; E02F 9/02; E02F 9/08; E02F 9/0808; E02F 9/10; E02F 9/12; E02F 9/16; B60G 99/002; B60G 13/003; B60G 2204/128

See application file for complete search history.

(56) References Cited

U.S. PATENT DOCUMENTS

| | | | |
|---|---|---|---|
| 6,374,935 B1 * | 4/2002 | Kirschenmann ... | B62D 33/0604 180/89.12 |
| 7,938,478 B2 * | 5/2011 | Kamimae ............ | E02F 9/166 296/190.08 |
| 8,246,107 B2 * | 8/2012 | Miyasaka .......... | B62D 33/0604 296/190.03 |
| 8,657,251 B2 * | 2/2014 | Kamimae ............ | E02F 9/166 296/190.04 |
| 9,908,497 B2 * | 3/2018 | Iwamoto ............ | B62D 33/0604 |
| 11,203,853 B2 * | 12/2021 | Lee .................... | B62D 33/0604 |

(Continued)

*Primary Examiner* — Gregory A Blankenship
(74) *Attorney, Agent, or Firm* — Donald J. Ersler

(57) ABSTRACT

A secondary retention device includes a bolt inserted through a cab floor and a modular saddle mount. A nut and the bolt retain the cab floor and the modular saddle mount together. A first alternative includes a yoke extending upward from the modular saddle mount, an extension plate extending downward from a bottom of the cab floor and a lock pin. A second alternative includes a bent over edge of the cab floor, a bent-up edge of the modular saddle mount and the lock pin. A third alternative includes a retention plate extending downward from the cab floor, a slot opening formed through a modular saddle mount to receive the retention plate and a fastener. A fourth alternative includes a curved tab extending upward from a modular saddle mount and a slot opening formed through the cab floor to receive the curved tab.

10 Claims, 27 Drawing Sheets

(56) References Cited

U.S. PATENT DOCUMENTS

| | | | | |
|---|---|---|---|---|
| 11,718,355 B2* | 8/2023 | Patrick | ............... | B62D 33/0604 |
| | | | | 296/190.07 |
| 2004/0245806 A1* | 12/2004 | Mori | ................. | B62D 33/0604 |
| | | | | 296/187.03 |
| 2006/0071499 A1* | 4/2006 | Yoon | ................. | B62D 33/0604 |
| | | | | 296/35.1 |
| 2009/0085377 A1* | 4/2009 | Hayes | ............... | B62D 33/0604 |
| | | | | 296/190.07 |
| 2012/0200116 A1* | 8/2012 | Klein | ................. | B62D 33/067 |
| | | | | 296/190.07 |
| 2017/0009425 A1* | 1/2017 | Tajima | .................... | E02F 9/166 |
| 2019/0185063 A1* | 6/2019 | Sasaki | ...................... | E02F 9/16 |
| 2019/0300076 A1* | 10/2019 | Tilp | .................... | B62D 33/077 |
| 2021/0179203 A1* | 6/2021 | Olsson | ............... | B62D 33/0604 |
| 2021/0332556 A1* | 10/2021 | Mulligan | ................. | E02F 9/163 |
| 2023/0132968 A1* | 5/2023 | Melotik | ............. | B62D 33/0604 |
| | | | | 248/636 |
| 2023/0134022 A1* | 5/2023 | McKinley | .......... | B62D 33/0604 |
| | | | | 296/190.07 |
| 2023/0137036 A1* | 5/2023 | Patrick | ................. | B62D 24/02 |
| | | | | 296/190.07 |
| 2023/0138826 A1* | 5/2023 | Patrick | ............... | B62D 33/0604 |
| | | | | 296/190.07 |
| 2023/0139365 A1* | 5/2023 | Patrick | ............... | B62D 33/0604 |
| | | | | 296/190.07 |

* cited by examiner

SECONDARY RETENTION DEVICES FOR RETAINING A HEAVY EQUIPMENT CAB ON A FRAME

BACKGROUND OF THE INVENTION

1. Field of the Invention

The present invention relates generally to heavy equipment and more specifically to secondary retention devices for retaining a heavy equipment cab on a frame, which prevents a heavy equipment cab from being separated from a frame during a roll over event.

2. Discussion of the Prior Art

The prior art discloses a number of mounting methods for reducing vibration to heavy equipment cabs. U.S. Pat. No. 7,364,223 to Mori et al discloses a cab supporting structure. U.S. Pat. No. 8,517,457 to Yamamoto et al. discloses a construction machine provided with cab. However, it appears that the prior art does not teach or suggest using a detachable saddle mount, which is selectively detachable from a modified frame cross member. The detachable saddle mount is also used for retaining at least one vibration isolator. It also appears that adding mass to a frame cross member to increase the mass thereof and reduce the natural frequency of the frame is also not disclosed in the prior art.

Accordingly, there is clearly felt need in the art for secondary retention devices for retaining a heavy equipment cab on a frame, which prevents a heavy equipment cab from being separated from a frame during a roll over event.

SUMMARY OF THE INVENTION

The present invention provides a modular saddle mount retained in a frame cross member for reducing vibration in heavy equipment cabs, which includes adding mass to a retention frame for reducing the natural frequency of the base frame of the heavy equipment to mitigate the occurrence of resonance. The heavy equipment base frame for in part retaining a cab preferably includes a modified frame cross member, a second frame cross member, a lengthwise frame rail, a corner frame and a cab mounting plate. The modified frame cross member extends inward from the lengthwise frame rail. The second frame cross member extends inward from the lengthwise frame rail. The corner frame extends inward from an end of the lengthwise frame rail and is secured to the second frame cross member. The isolator mounting plate is secured to the lengthwise frame rail and the corner frame. An isolator opening is formed in each end of the isolator mounting plate.

The modular saddle mount and modified frame cross member for reducing vibration in heavy equipment cabs (modular saddle mount system) preferably includes the modified frame cross member, a modular saddle mount and at least one vibration isolator. The modified frame cross member preferably includes a frame cross member, two sets of opposed mounting blocks and two cutout filler inserts. The modified cross member preferably includes a first cutout and a second cutout. The first and second cutouts are created to receive two modular saddle mounts. The first and second cutouts allow an overall height of the heavy equipment to be adjusted. Each opposed mounting block is secured to an outside surface of a side of the frame cross member with any suitable attachment method, such as welding. Each mounting block preferably includes at least one tapped hole. The first and second cutout inserts are attached to perimeters of the first and second cutouts. The two cutout filler plates restore rigidity to the frame cross member.

The modular saddle mount preferably includes a saddle base member and a pair of fastening inserts. The saddle base member preferably includes a top saddle member, a first side member and a second side member. The saddle base member is preferably fabricated from a single piece of material. The saddle base member and the pair of fastening inserts have a preferable thickness of about 12 mm. However, other thicknesses may also be used to boost vibrational performance of the modular saddle mount. The first and second side members are created by bending over the first and second sides of the top saddle member, respectively. A fastening cutout is formed in each end of the saddle base member to provide clearance for the pair of fastening inserts. Each fastening insert preferably includes a securement flange and an upright flange. The pair of fastening inserts are retained on an inside surface of the saddle base member at opposing ends thereof. At least one isolator opening is formed through the top saddle member to receive a vibration isolator. A plurality of threaded taps are formed through the top saddle member and around a perimeter of the isolator opening, if the vibration isolator includes an attachment flange. Vibration isolators with flanges are referred to as flange mounted isolators.

An isolator adapter insert may be secured to a top of the top saddle member, under the vibration isolator. Top and bottom roll over protection plates may be placed above and below the attachment flange of a vibration isolator. At least one roll over protection (ROPS) secondary retention hole may be formed through the top saddle member to receive a ROPS secondary retention bolt. A location of the ROPS secondary retention hole is located to the side of a single vibration isolator or between two vibration isolators. A non-flanged or a through-bolt type vibration isolator also may be used with the modular saddle mount. A modular saddle mount may be created to accommodate a flange mounted vibration isolator or a through-bolt vibration isolator. Use of two flange mounted, through-bolt, or a combination of the flange and through-bolt vibration isolators may be used to increase effective frequency range or shift effective frequency range.

Secondary retention devices prevent a heavy equipment cab from separating from a frame during a roll-over event. The second retention device includes a bolt inserted through a cab floor of a heavy equipment cab and a modular saddle mount. A nut is threaded on to the bolt to retain the heavy equipment cab and the modular saddle mount together. A first alternative of a secondary retention device includes a yoke extending upward from a modular saddle mount, an extension plate extending downward from a bottom of a cab floor and a lock pin. The lock pin is inserted through the yoke and extension plate and retained in place with a lock clip. A second alternative of a secondary retention device includes a bent over edge of a cab floor, a bent-up edge of a modular saddle mount and a lock pin. The lock pin is inserted through the bent edge of the cab floor and the bent-up edge of the modular saddle mount. The lock pin is held in place with a lock clip.

A third alternative of a secondary retention device includes a retention plate extending downward from a cab floor, a slot opening formed through a top of a modular saddle mount to receive the retention plate and a fastener inserted through the retention plate and a side wall of the modular saddle mount. A nut is threaded on to the bolt to retain the bolt in place. A fourth alternative of a secondary retention device includes a curved tab extending upward from a modular saddle mount and a slot opening formed through a cab floor to receive the curved tab. The curved tab is inserted through the slot opening. An isolator bolt is secured to a vibration isolator in the modular saddle mount.

Accordingly, it is an object of the present invention to provide a modular saddle mount system, which reduces the natural frequency of the base frame of the heavy equipment.

It is a further object of the present invention to provide a modular saddle mount system, which uses a saddle mount which is selectively detachable from a modified frame cross member.

It is yet a further object of the present invention to provide a modular saddle mount of a modular saddle mount system, which is capable of retaining at least one vibration isolator.

It is yet a further object of the present invention to provide an isolator adapter insert for retention in a modular saddle mount or an isolator mounting plate for reducing vibration in heavy equipment cabs, which allows different size vibration isolators to be used a single modular saddle mount or isolator mounting plate.

Finally, it is another object of the present invention to provide secondary retention devices for retaining a heavy equipment cab on a frame, which prevents a heavy equipment cab from being separated from a frame during a roll over event.

These and additional objects, advantages, features and benefits of the present invention will become apparent from the following specification.

DETAILED DESCRIPTION OF THE PREFERRED EMBODIMENTS

Figure 1:
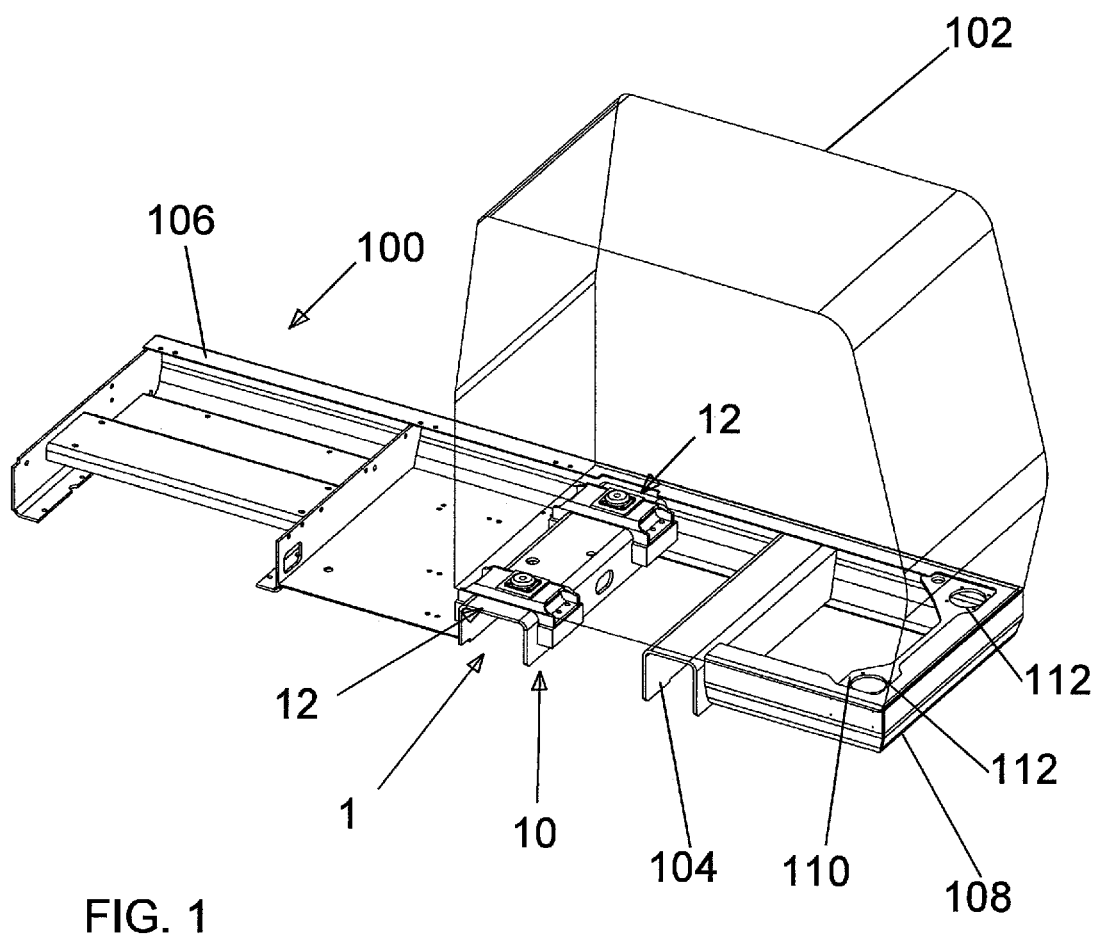
FIG. 1 is a perspective view of a portion of a heavy equipment base frame and a cab, which illustrate the installation of the modular saddle mount system in accordance with the present invention.

With reference now to the drawings, and particularly to FIG. 1, there is shown a perspective view of a portion of a heavy equipment base frame 100 for retaining a cab 102. The heavy equipment frame base 100 preferably includes a modified frame cross member 10, a second frame cross member 104, a lengthwise frame rail 106, a corner frame 108 and a cab mounting plate 110. The modified frame cross member 10 extends inward from the lengthwise frame rail 106. The second frame cross member 104 extends inward from the lengthwise frame rail 106. The corner frame 108 extends inward from an end of the lengthwise frame rail 106 and is secured to the second frame cross member 104 with welding or any other suitable attachment process. The cab mounting plate 110 is secured to the lengthwise frame rail 106 and the corner frame 108. An isolator opening 112 is formed in each end of the cab mounting plate 110.

Figure 2:
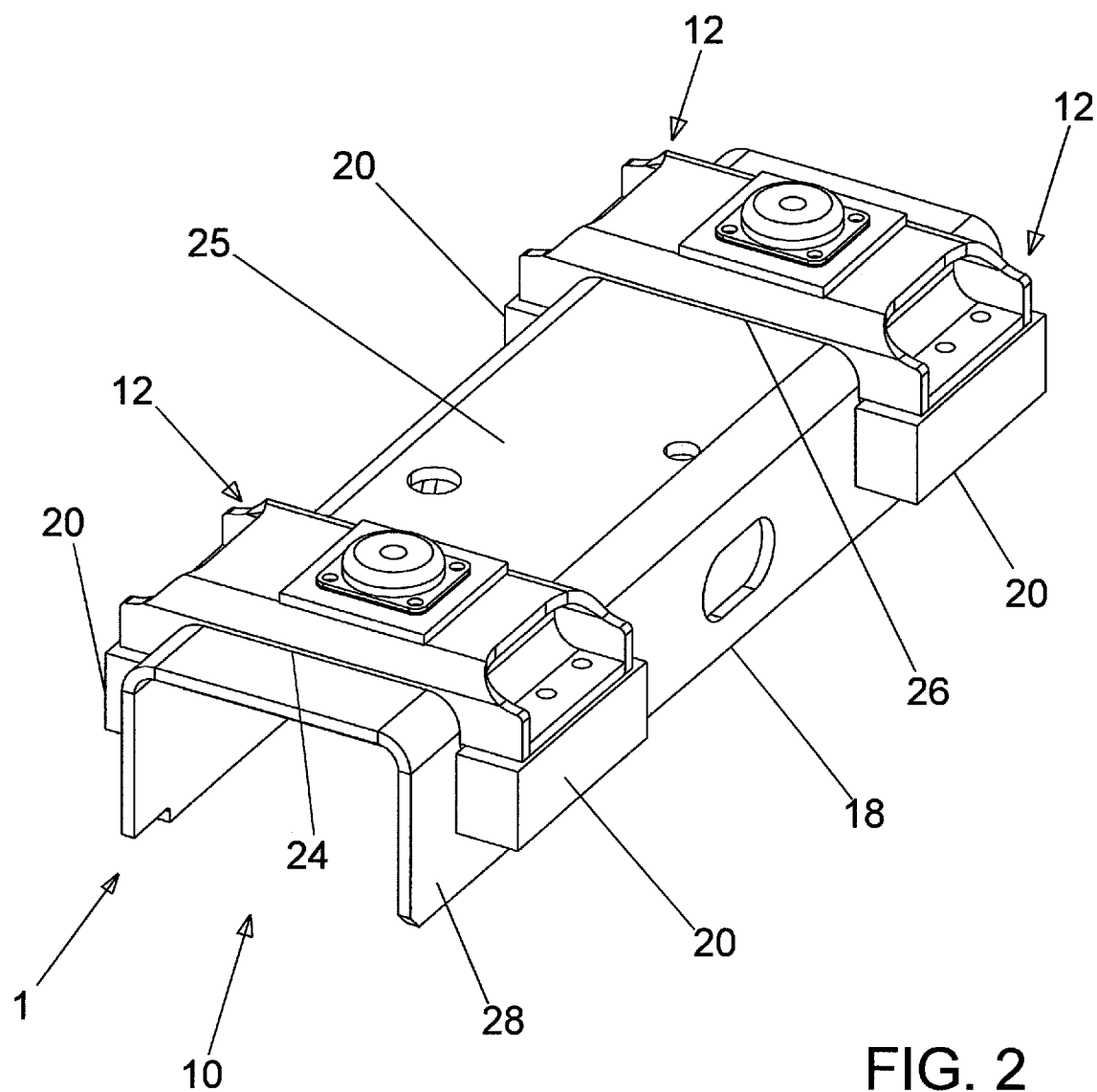
FIG. 2 is a perspective view of a modular saddle mount system with a modified frame cross member and a single isolator retained in two modular saddle mounts in accordance with the present invention.
Figure 3:
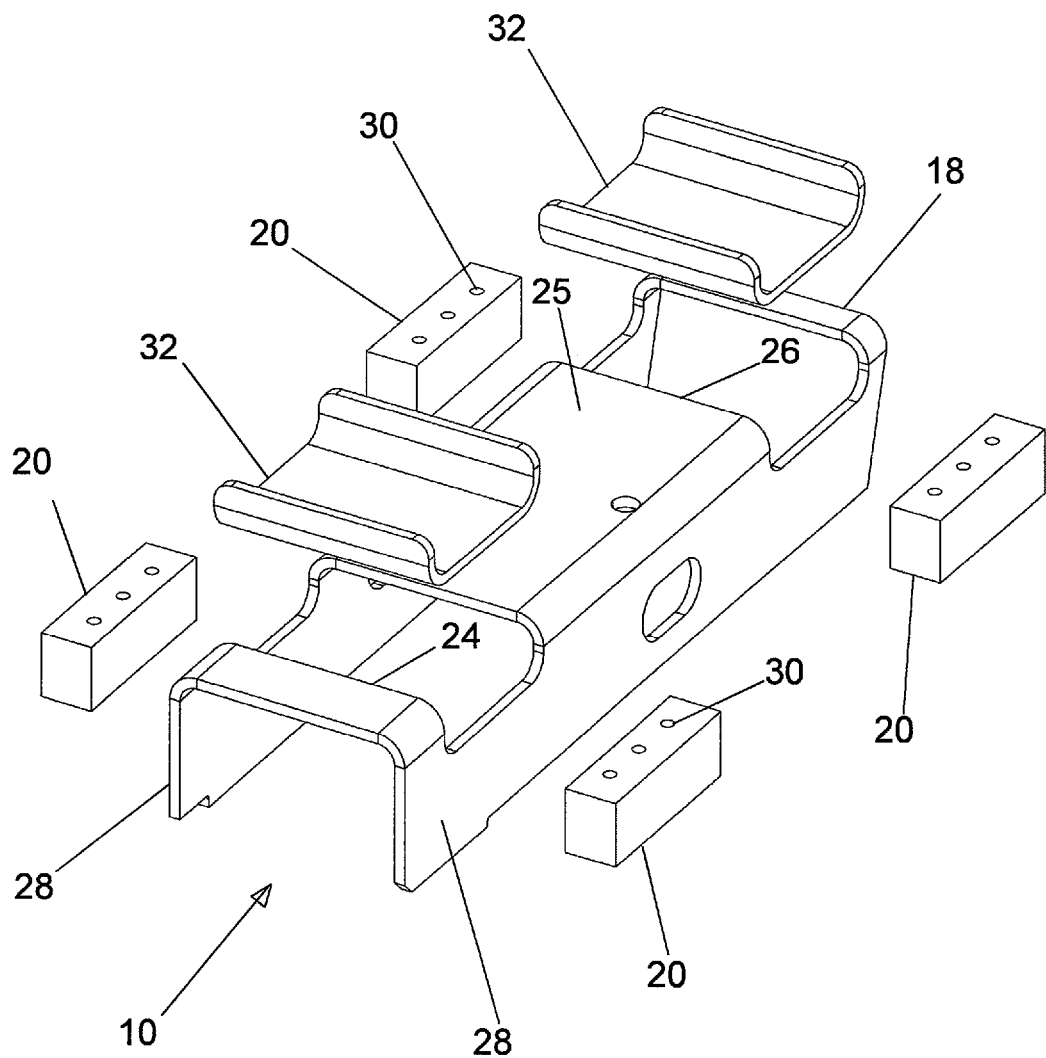
FIG. 3 is an exploded perspective view of a modified frame cross member of a modular saddle mount system in accordance with the present invention.
Figure 4:
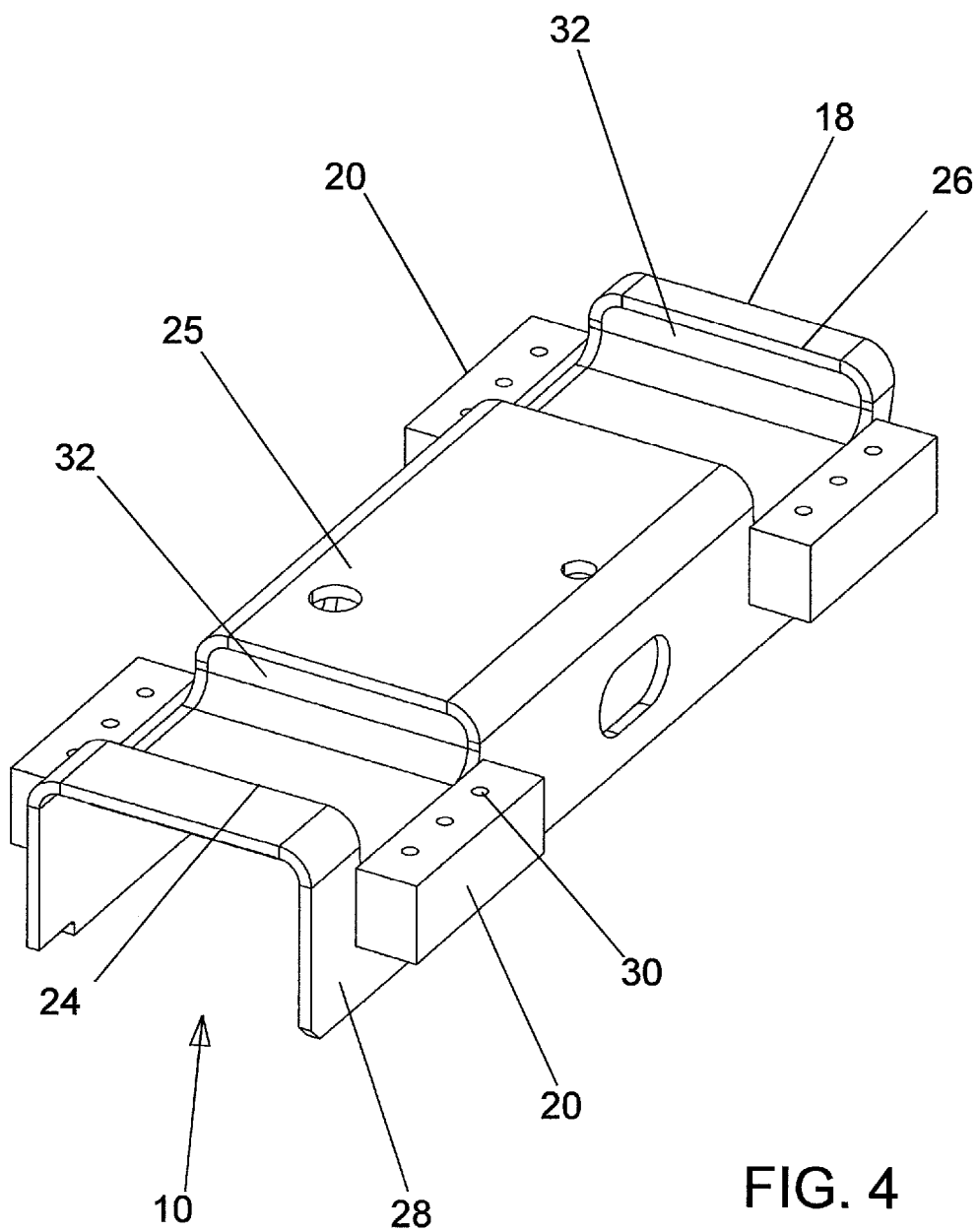
FIG. 4 is a perspective view of a modified frame cross member of a modular saddle mount system in accordance with the present invention.
Figure 4A:
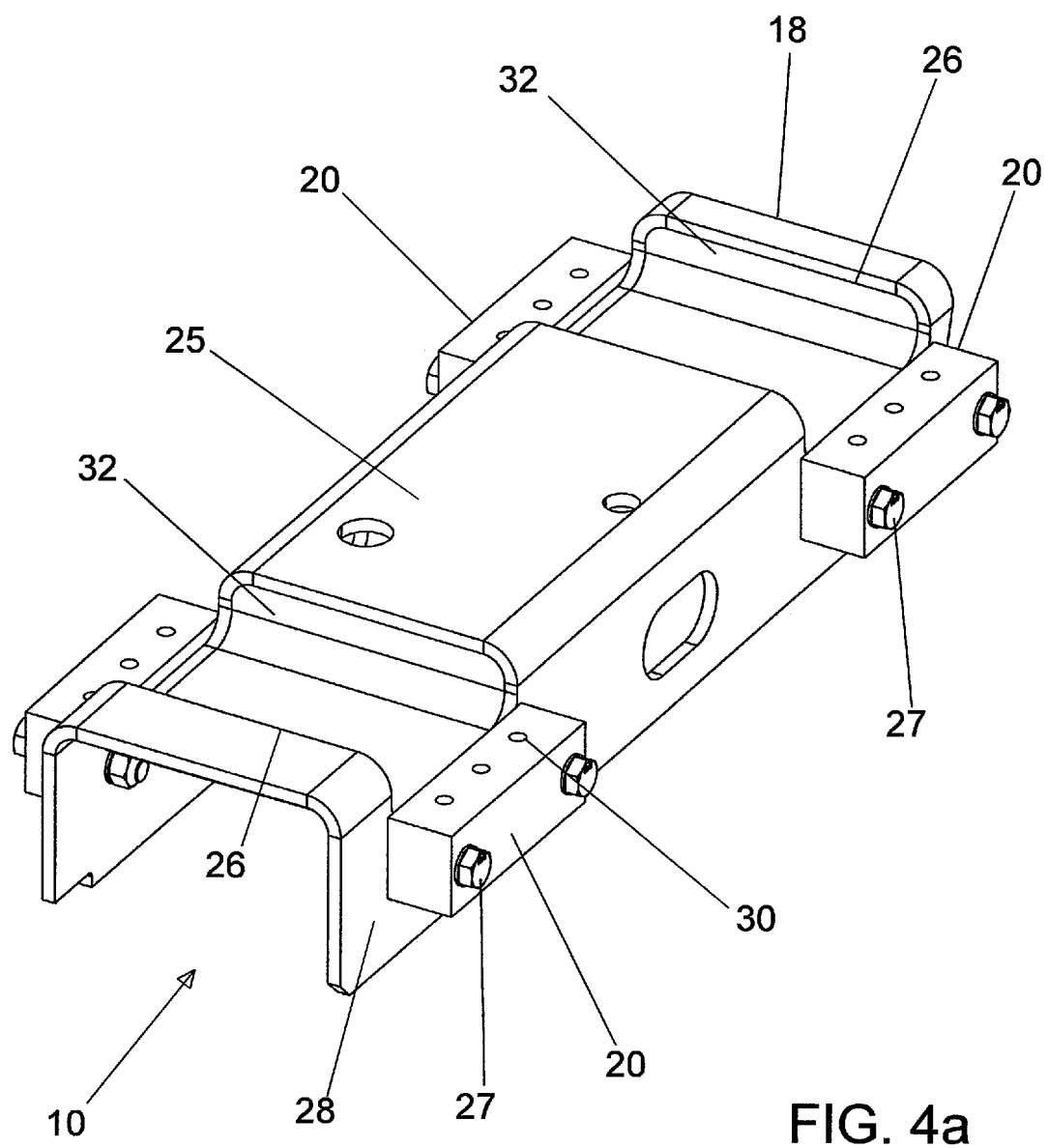
FIG. 4a is a perspective view of a modified frame cross member with opposed mounting blocks attached to the modified frame cross member with fasteners of a modular saddle mount system in accordance with the present invention.
Figure 4B:
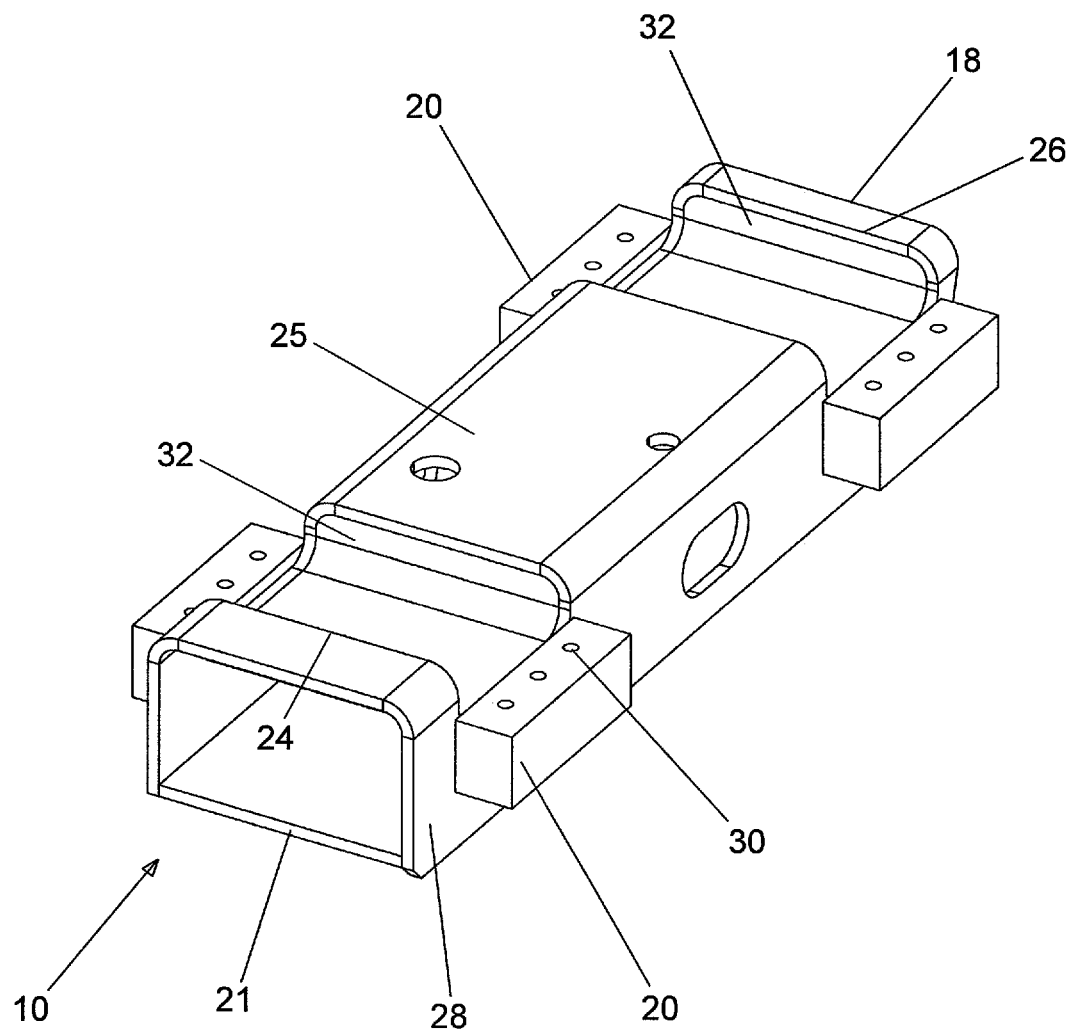
FIG. 4b is a perspective view of an alternative embodiment of a modified frame cross member with a strengthening plate attached to a bottom thereof to increase rigidity in accordance with the present invention.
Figure 4C:
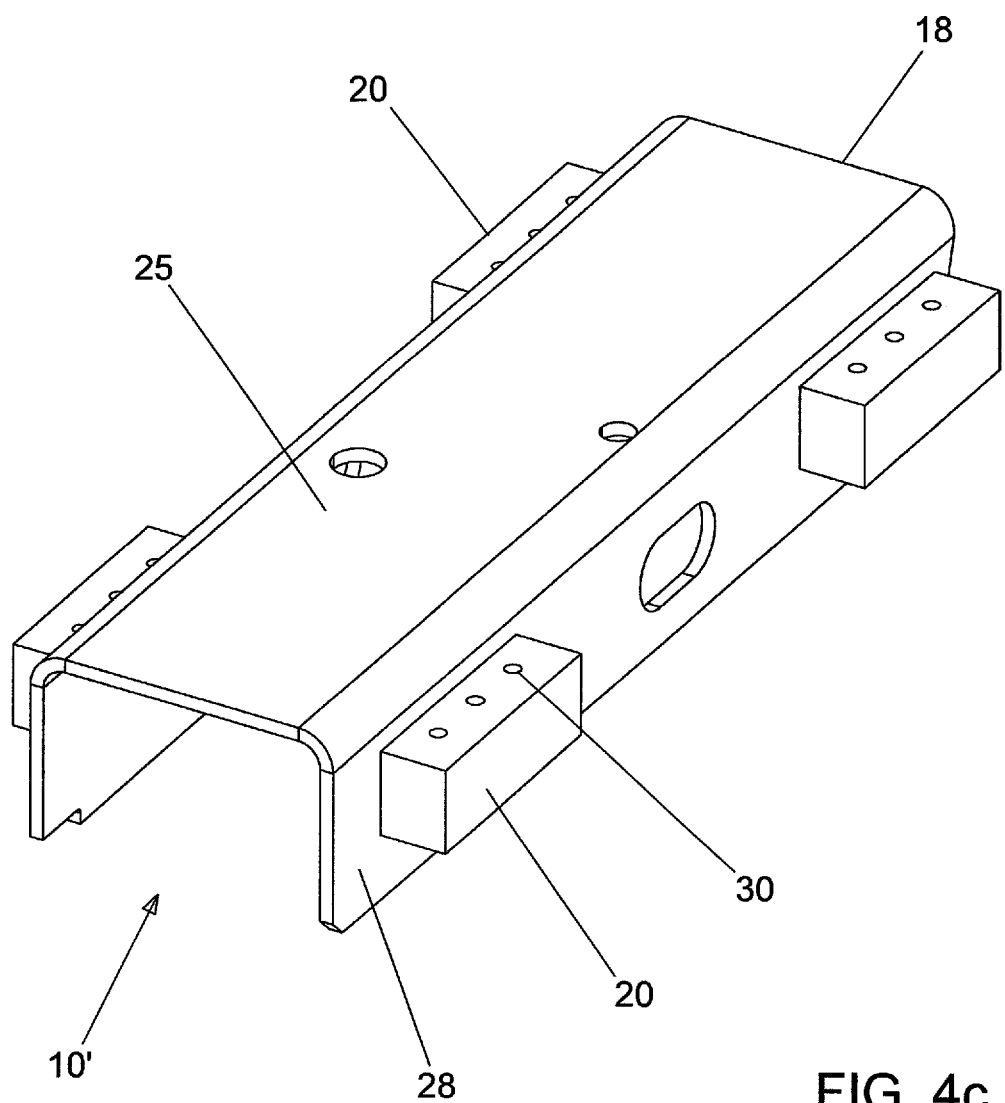
FIG. 4c is a perspective view of a second alternative embodiment of a modified frame cross member, which does not include a first cutout and a second cutout in accordance with the present invention.

With reference to FIGS. 2-4, the modular saddle mount and modified frame cross member for reducing vibration in heavy equipment cabs (modular saddle mount system) 1 preferably includes the modified frame cross member 10, two modular saddle mounts 12 and at least two vibration isolator 14, 16. The modified frame cross member 10 preferably includes a frame cross member 18, two sets of opposed mounting blocks 20 and two cutout filler plates 32. The frame cross member 18 preferably includes a first cutout 24 and a second cutout 26. The first and second cutouts 24, 26 are created to receive the two modular saddle mounts 12. The first and second cutouts 24, 26 allow an overall height of the heavy equipment to be modified. The frame cross member 18 includes a base member 25 and two side walls 28 that extend downward from opposing sides of the base member 25. Each opposed mounting block 20 is secured to an outside surface of the side walls 28 of the frame cross member 18 with any suitable attachment method, such as welding. With reference to FIG. 4a, the opposed mounting blocks 20 are attached to frame cross member 18 with fasteners 27. With reference to FIG. 4b, the frame cross member 18 includes a strengthening plate 21 attached to a bottom of the frame cross member 18 to increase rigidity of the frame cross member 18. With reference to FIG. 4c, a modified frame cross member 10' does not include the first cutout 24 and the second cutout 26.

Each mounting block 20 preferably includes at least one tapped hole 30. A top of each mounting block 20 is preferably located above a bottom of the first and second cutouts 24, 26. However, a top of each mounting block 20 could be located at a bottom of the first and second cutouts 24, 26 or below the bottom of the first and second cutouts 24. With reference to FIG. 10a, locating the top of each mounting block 20 below the bottom of the first and second cutouts 24, 26, would require spacers or standoffs 25 extending from a bottom of the modular saddle mounts 12. The modular saddle mount 12 is preferably a sacrificial component. The first and second cutouts 24, 26 are preferably filled with the two cutout filler plates 32. The two cutout filler plates restore rigidity to the frame cross member 18.

Figure 5:
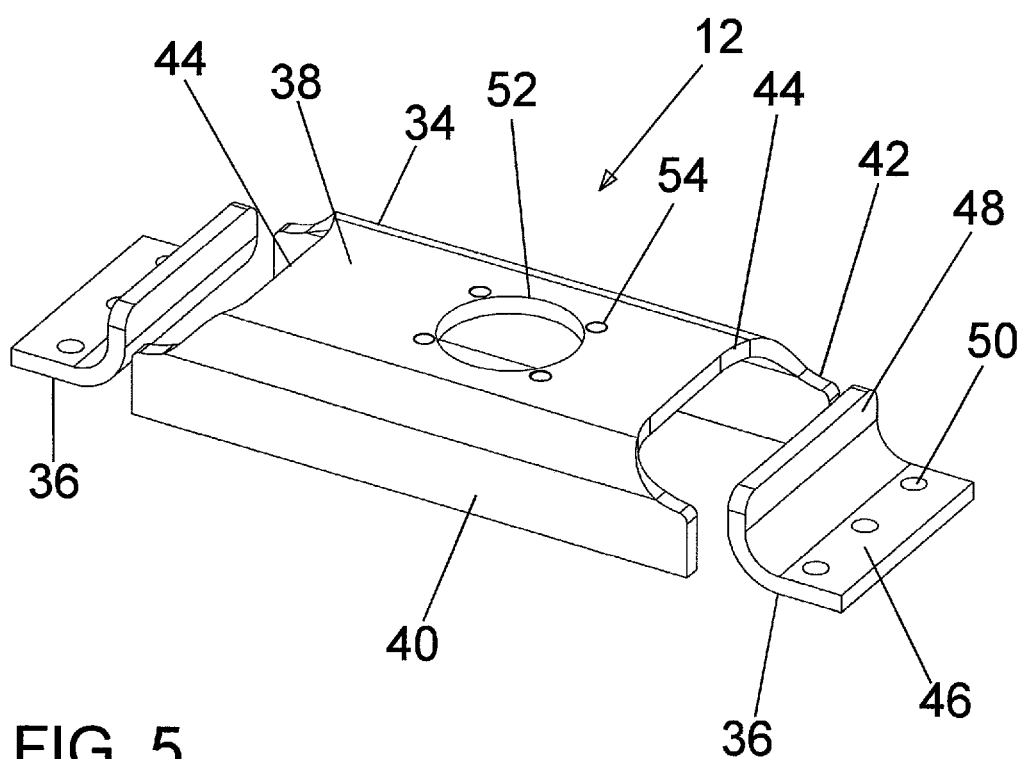
FIG. 5 is an exploded perspective view of a modular saddle mount with a single isolator opening of a modular saddle mount system in accordance with the present invention.
Figure 6:
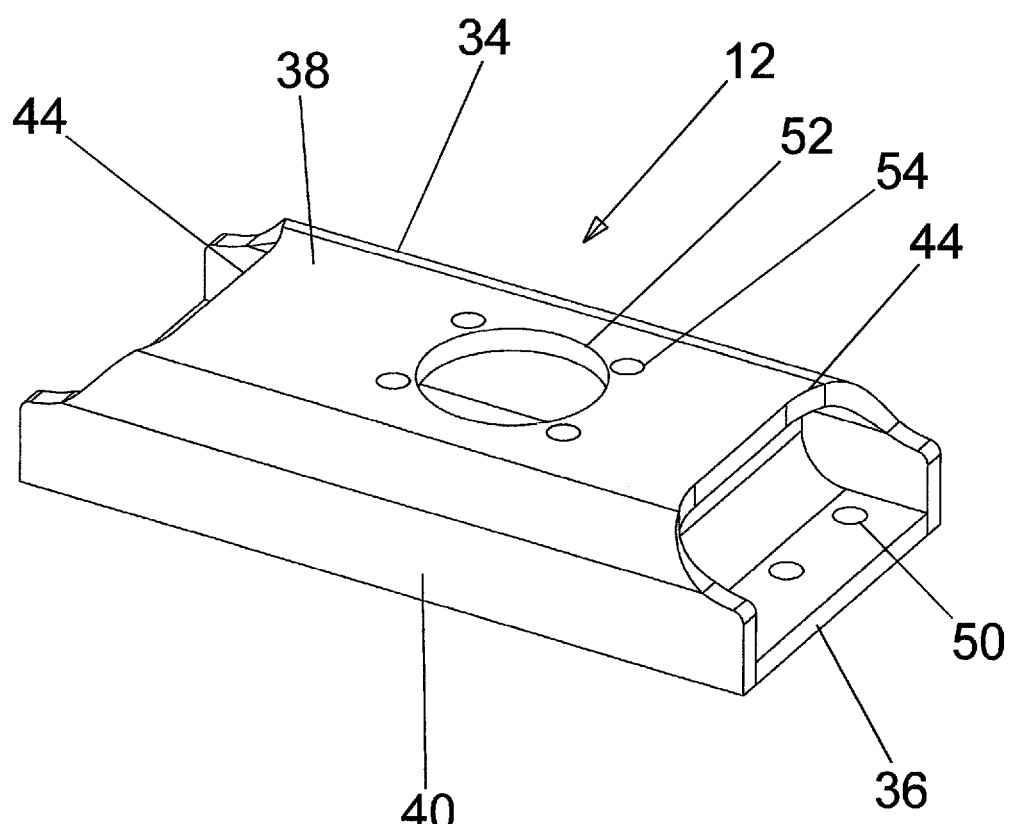
FIG. 6 is a perspective view of a modular saddle mount with a single isolator opening of a modular saddle mount system in accordance with the present invention.

With reference to FIGS. 5-6, the modular saddle mount 12 preferably includes a saddle base member 34 and a pair of fastening inserts 36. However, the saddle base member 34 and the pair of fastening inserts 36 could made from a single piece of material. The saddle base member 34 preferably includes a top saddle member 38, a first side member 40 and a second side member 42. The saddle base member 34 is preferably fabricated from a single piece of material. The saddle base member 34 and the pair of fastening inserts 36 have a preferable thickness of about 12 mm. However, other thicknesses may be used to boost vibrational performance of the modular saddle mount 34. The first and second side members 40, 42 are created by bending over the first and second sides of the top saddle member 38, respectively. A fastening cutout 44 is formed in each end of the saddle base member 34 to provide clearance for the pair of fastening inserts 36. Each fastening insert 36 preferably includes a securement flange 46 and an upright flange 48. The pair of fastening inserts 36 are retained on an inside surface of the saddle base member 34 at opposing ends thereof. At least one saddle fastening hole 50 is formed through each fastening insert 36 to allow attachment of the modular saddle mount 12 to the pair of mounting blocks 20 with at least two fasteners (not shown).

Figure 6A:
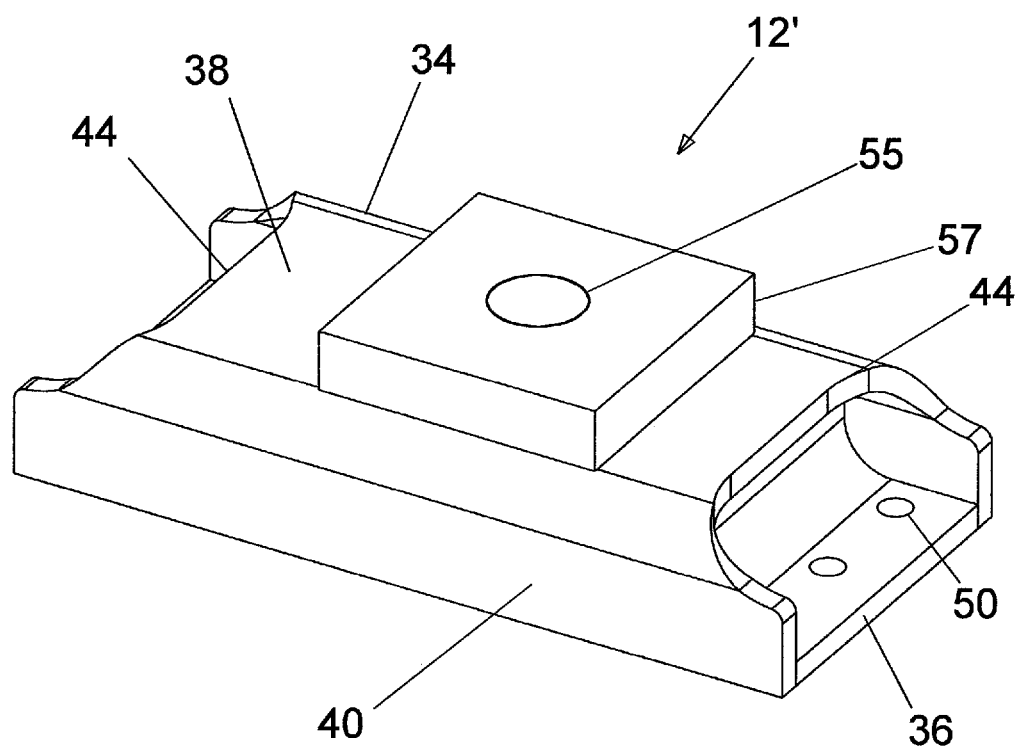
FIG. 6a is an exploded perspective view of a modular saddle mount with a support block and a bolt hole formed through the support block of a modular saddle mount system in accordance with the present invention.

With reference to FIG. 6*a*, a modular saddle member 12' preferably includes a support block 57 and at least one bolt hole 55 formed through the modular saddle member 12' for receiving a cable bolt 58 or the like. An isolator opening 52 and a plurality of threaded taps 54 are replaced with the at least one bolt hole 55 and the support block 57. The modular saddle mount 12 is preferred to experience non-linear deformation instead of the modified frame cross member 10. It is easier to unbolt a deformed modified frame cross member instead of repairing a damaged modified frame cross member 10. The modular saddle mount 12 is preferably a sacrificial component.

Figure 7:
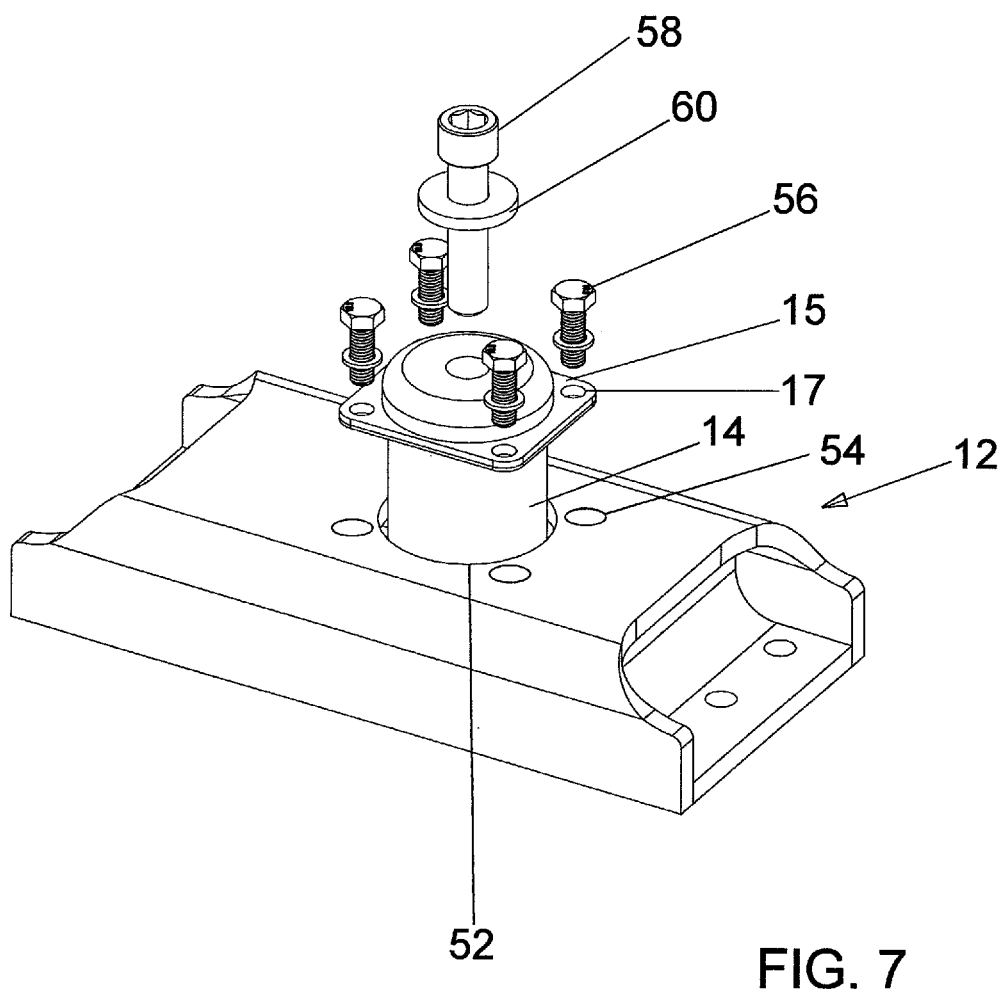
FIG. 7 is an exploded perspective view of a modular saddle mount and a single vibration isolator with an attachment flange before attachment to the modular saddle mount of a modular saddle mount system in accordance with the present invention.
Figure 11:
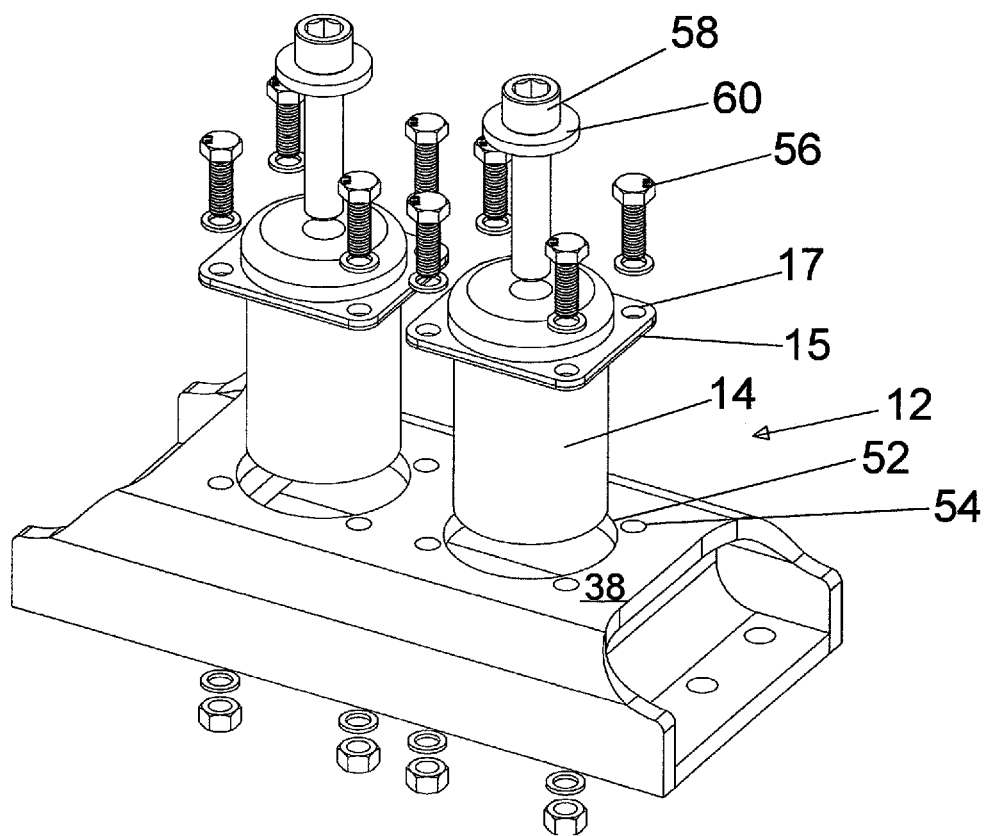
FIG. 11 is an exploded perspective view of a modular saddle mount and two vibration isolators with attachment flanges before attachment to the modular saddle mount of a modular saddle mount system in accordance with the present invention.

With reference to FIGS. 7 and 11, at least one isolator opening 52 is formed through the top saddle member 38 to receive a vibration isolator 14. A plurality of threaded taps 54 are formed through the top saddle member 38 and around a perimeter of the isolator opening 52, if the vibration isolator 14 includes an attachment flange 15. Vibration isolators 14 with flanges 15 are referred to as flange mounted isolators. A plurality of threaded fasteners 56 are inserted through a plurality of fastening holes 17 in the attachment flange and threaded into the plurality of threaded taps 54. A cab fastener 58 with a washer 60 are used to secure the cab 102 to the vibration isolator 14.

Figure 8:
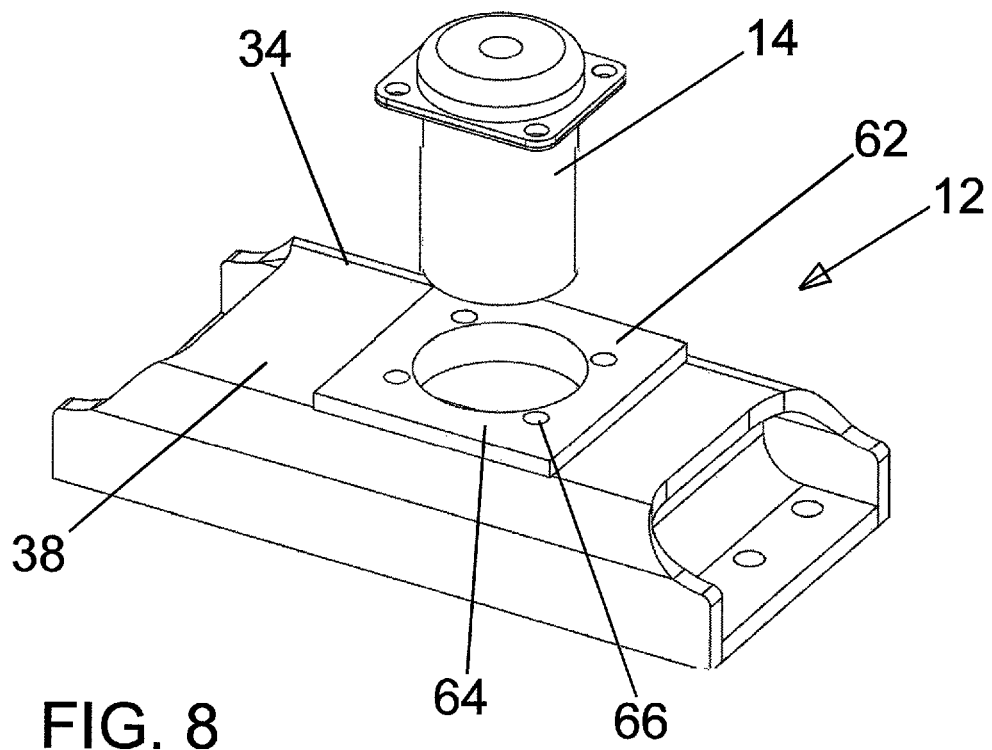
FIG. 8 is an exploded perspective view of a modular saddle mount with an isolator adapter insert and a single vibration isolator with an attachment flange before attachment to the modular saddle mount of a modular saddle mount system in accordance with the present invention.
Figure 8A:
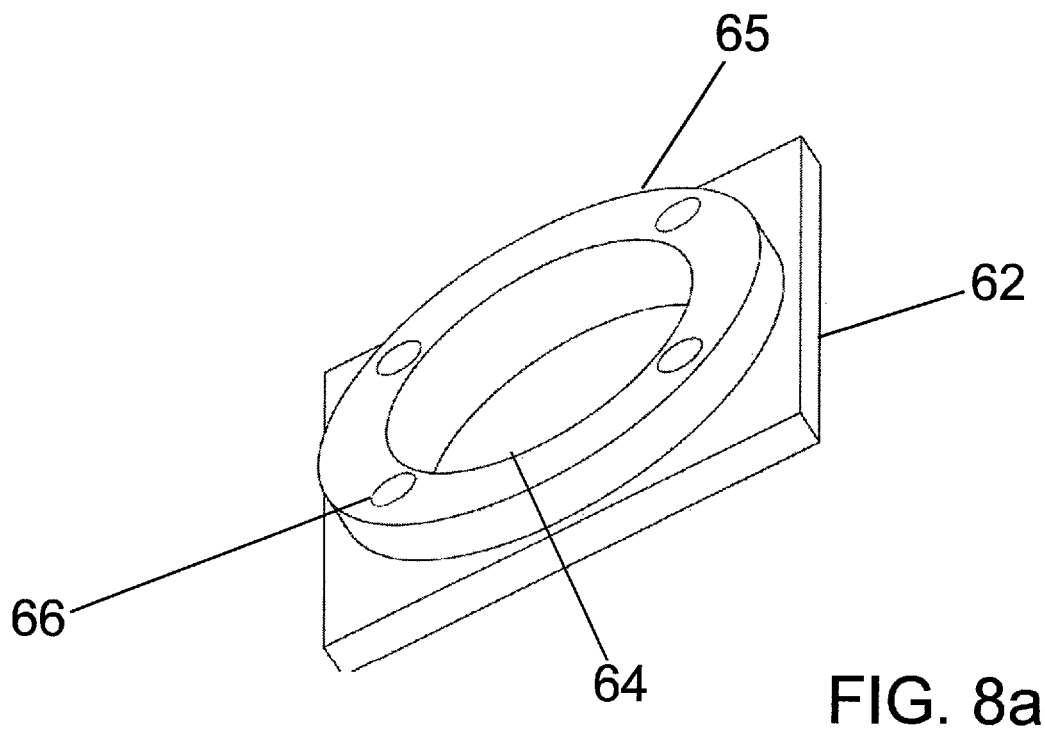
FIG. 8a is a bottom perspective view of an isolator adapter insert of a modular saddle mount system in accordance with the present invention.
Figure 9:
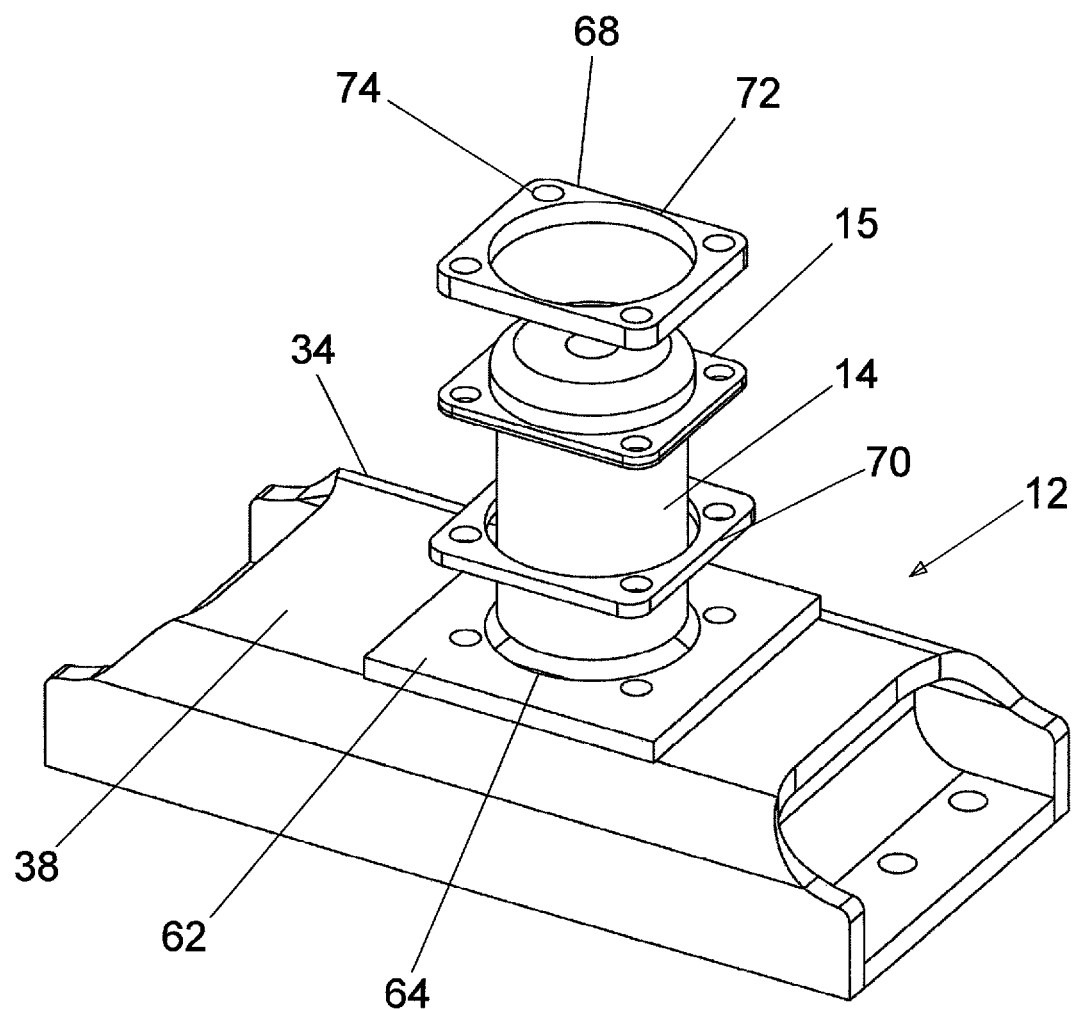
FIG. 9 is an exploded perspective view of a modular saddle mount with an isolator adapter insert and a single vibration isolator with an attachment flange retained between top and bottom roll over protection plates before attachment to the modular saddle mount of a modular saddle mount system in accordance with the present invention.

With reference to FIGS. 8-8*a*, an isolator adapter insert 62 may be secured to the top of the top saddle member 38, under the vibration isolator 14. A location boss 65 preferably extends from a bottom of the isolator adapter insert 62. The location boss 65 is sized to be received by an isolator opening [not shown]. An isolator opening 64 and a plurality of threaded taps 66 are also formed through the isolator adapter insert 62. The isolator adapter insert 62 is designed in a way that it allows either flange mounted or through-bolt vibrational isolators to be utilized in a saddle or on an equipment frame with no necessary modifications. Isolator adapter inserts 62 with the same location boss size 65, but with different size isolator openings 64 would allow the isolator adapter insert 62 to be replaced without having the need for multiple modular saddle mounts 12 with different size insert openings 52. With reference to FIG. 9, a top roll over protection plate 68 is placed on top of the flange 15 of the vibration isolation 14 and a bottom roll over protection plate 70 is placed under the flange 15. The top and bottom roll over protection plates 68, 70 include isolator openings 72 and fastener clearance holes 74.

Figure 10:
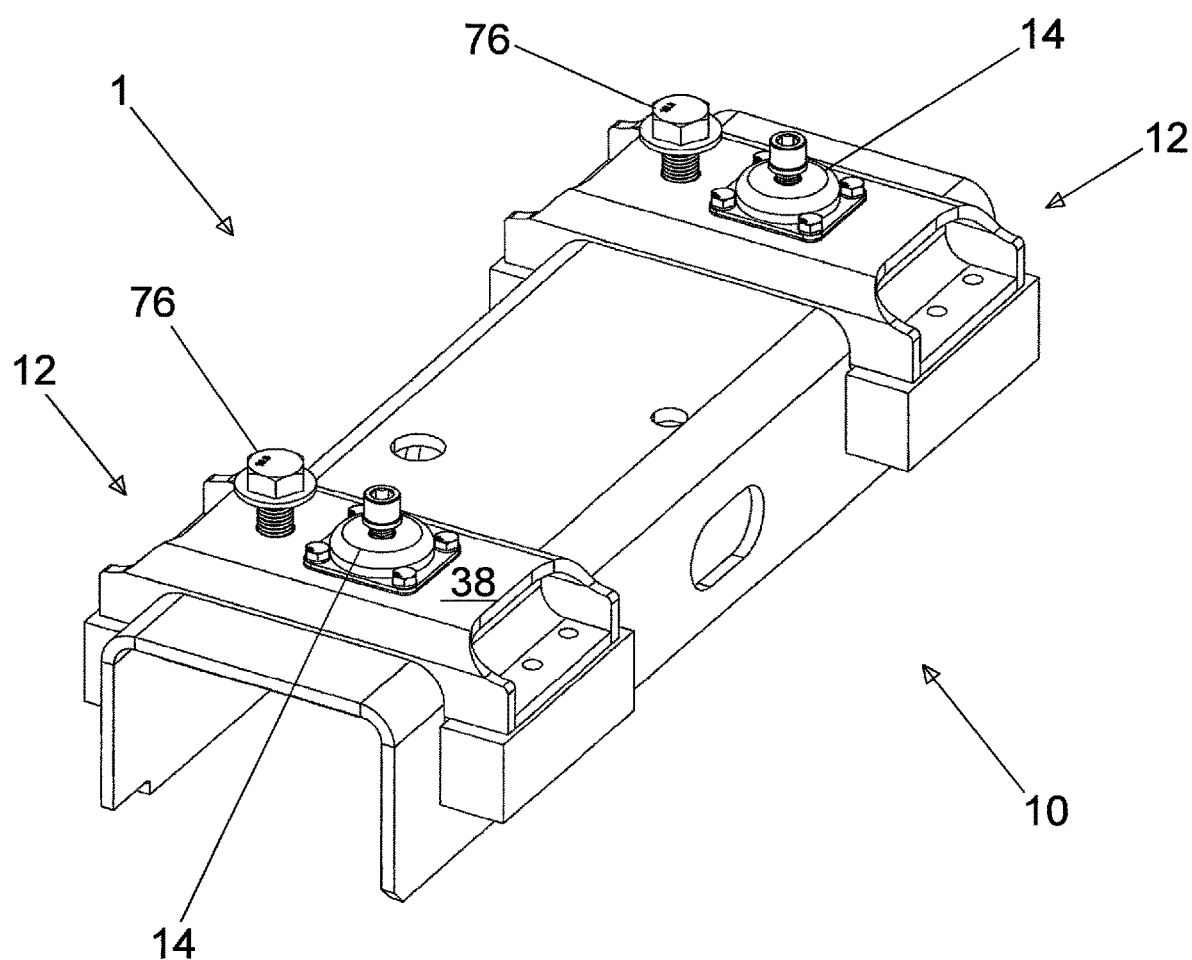
FIG. 10 is a perspective view of a modular saddle mount with a single vibration isolator with an attachment flange and a roll over protection secondary retention bolt retained in the modular saddle mount in accordance with the present invention.
Figure 10A:
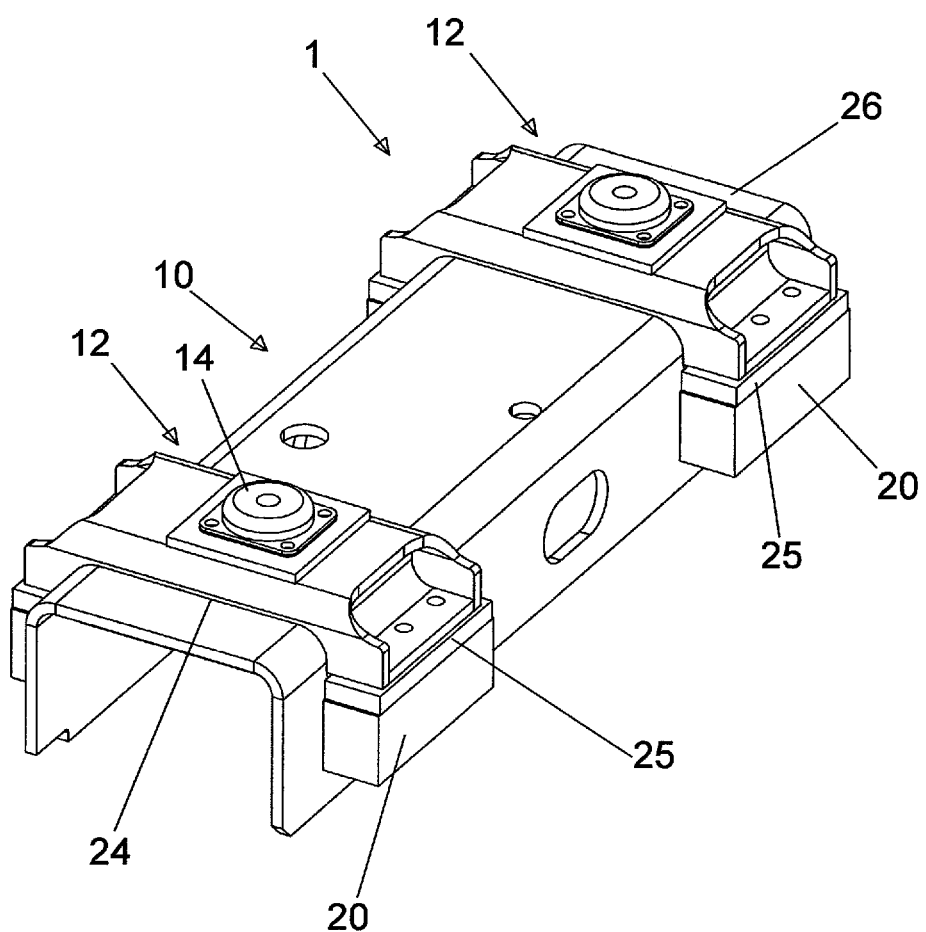
FIG. 10a is a perspective view of two modular saddle mounts with standoffs or spacers extending from a bottom thereof and tops of opposed mounting blocks located below a bottom of the first and second cutouts of a modified frame cross member in accordance with the present invention.
Figure 12:
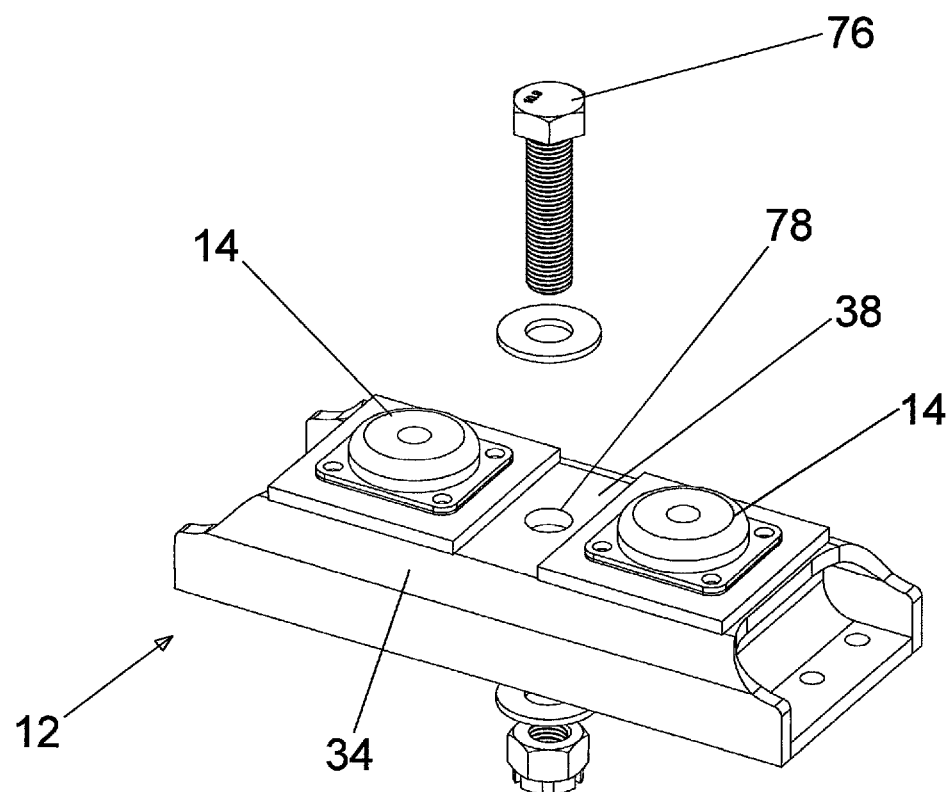
FIG. 12 is a partially exploded perspective view of a modular saddle mount with two isolator adapter inserts and two vibration isolators with attachment flanges before attachment to the modular saddle mount of a modular saddle mount system and a roll over protection secondary retention bolt retained in the modular saddle mount in accordance with the present invention.
Figure 13:
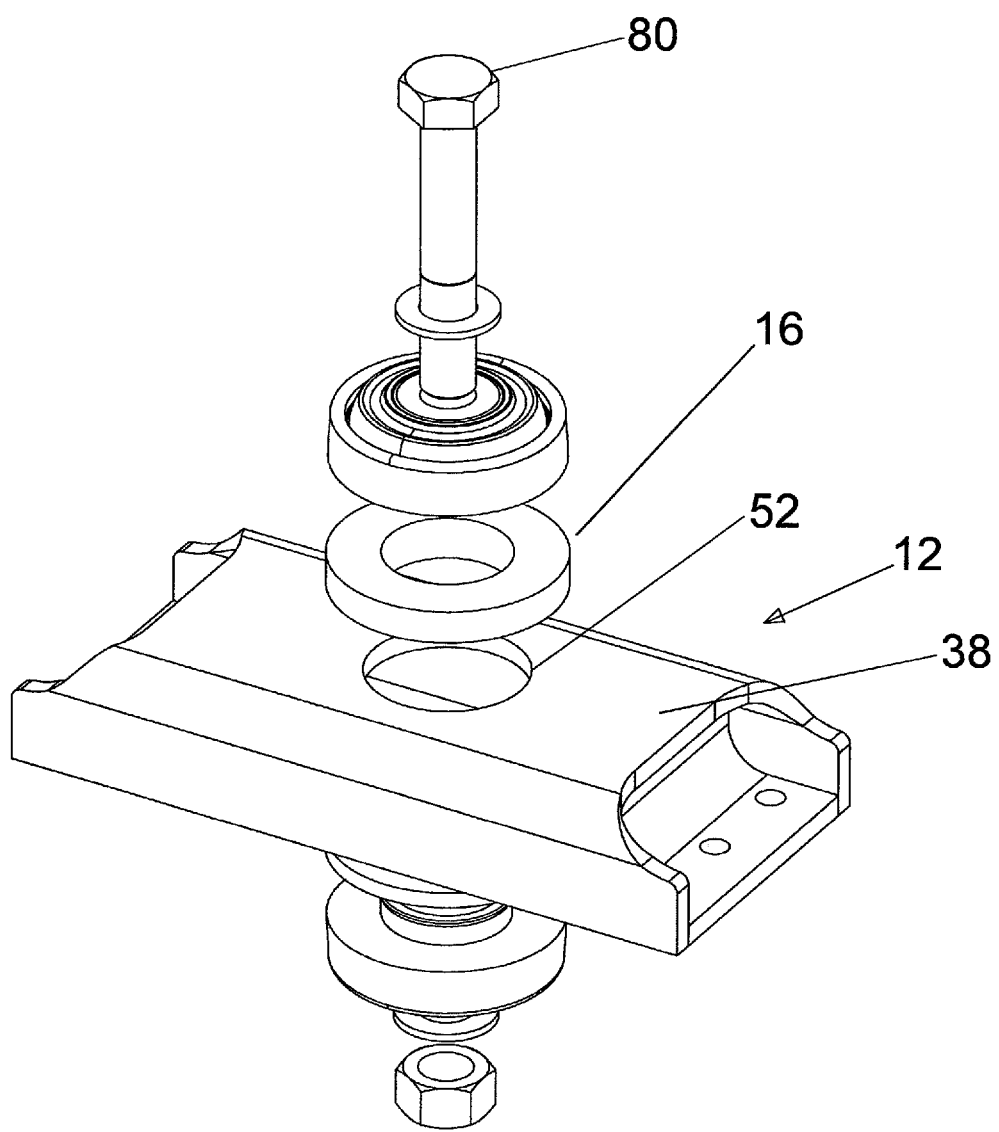
FIG. 13 is an exploded perspective view of a modular saddle mount and a single through-bolt vibration isolator before attachment to the modular saddle mount of a modular saddle mount system in accordance with the present invention.
Figure 14:
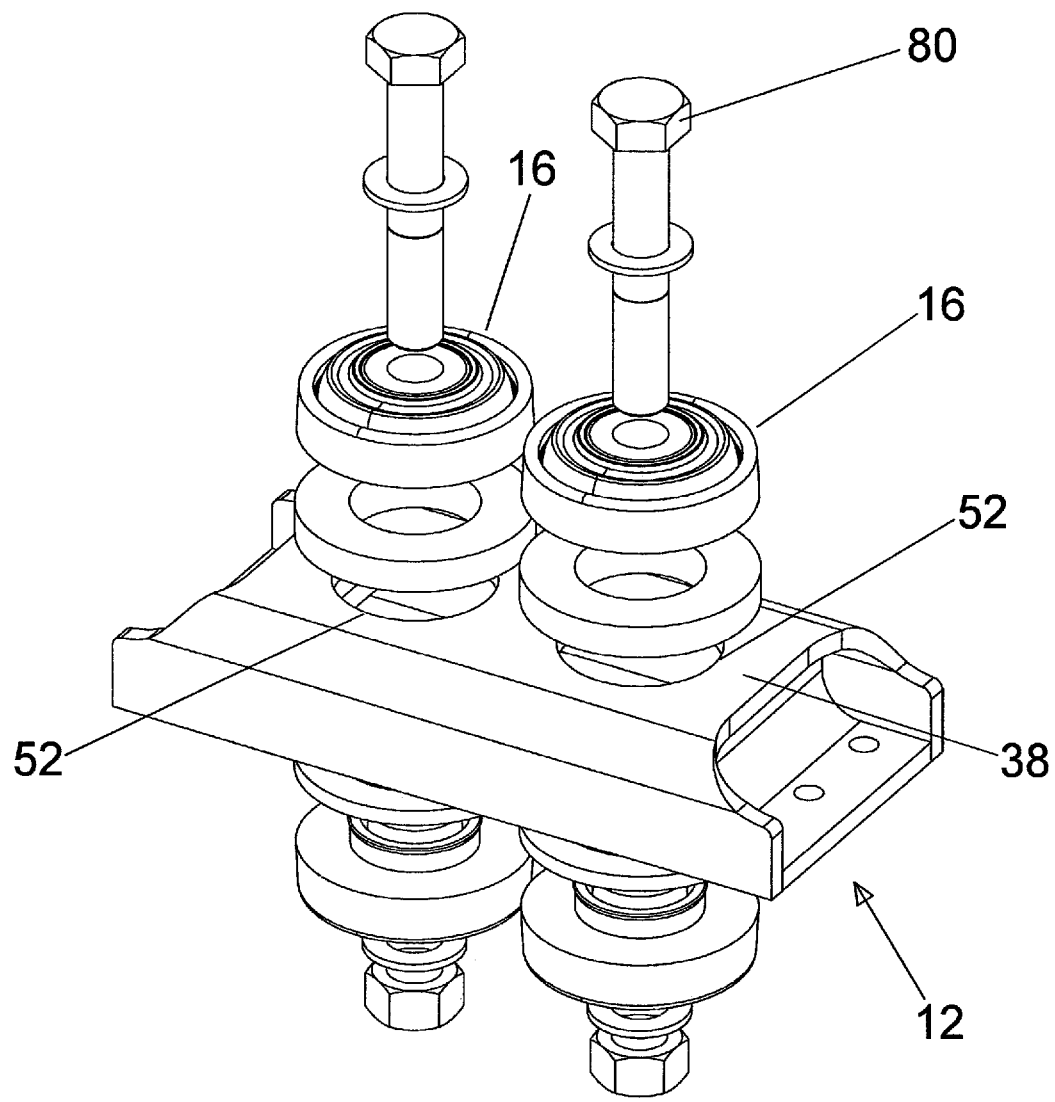
FIG. 14 is an exploded perspective view of a modular saddle mount and two through-bolt vibration isolators before attachment to the modular saddle mount of a modular saddle mount system in accordance with the present invention.
Figure 15:
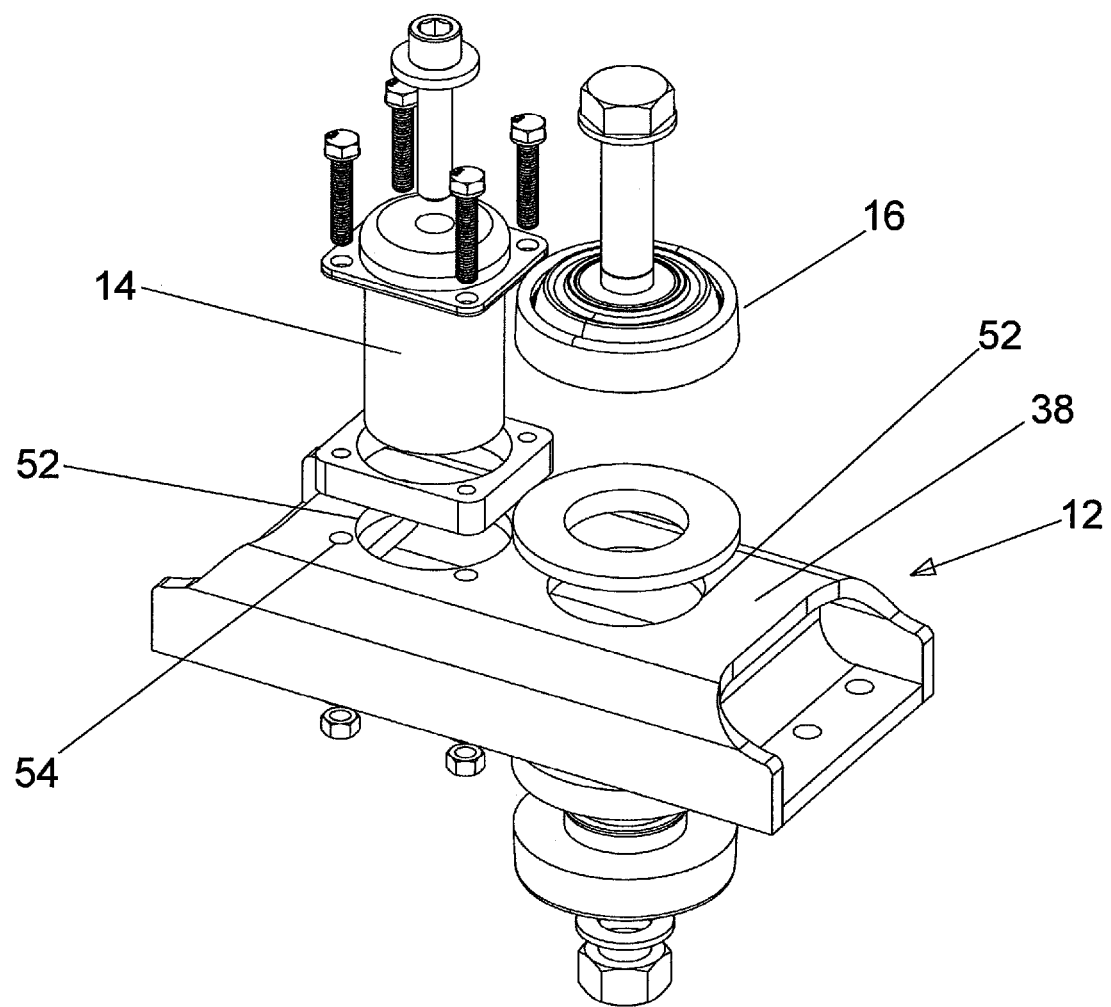
FIG. 15 is an exploded perspective view of a modular saddle mount, a vibration isolator with an attachment flange and a second vibration isolator, before attachment to the modular saddle mount of a modular saddle mount system in accordance with the present invention.

With reference to FIG. 10, at least one roll over protection (ROPS) secondary retention hole may be formed through the top saddle member 38 to receive a retention bolt 76. The ROPS secondary retention hole is located to the side of a single vibration isolator 14. With reference to FIG. 12, at least one roll over protection (ROPS) hole may be formed through the top saddle member 38 to receive the retention bolt 76. A location of the ROPS hole 78 is located between first and second vibration isolators 14. With reference to FIGS. 13-14, a through-bolt vibration isolator 16 may also be used with the modular saddle mount 12. The plurality of fasteners 56 are eliminated, because a cab retention bolt 80 is used to retain the vibration isolator 16 in the top saddle member 38. With reference to FIG. 15, a modular saddle mount 12 may be created to accommodate a flange mounted vibration isolator 14 and a through-bolt type vibration isolator 16. Two isolator holes 52 are formed through the top saddle member 38. The plurality of plurality of threaded taps 54 are formed around the isolator hole 52 for the vibration isolator 14. Use of two flange mounted, through-bolt, or a combination of flange mounted and through-bolt vibration isolators may be used to increase effective frequency range or shift effective frequency range.

Figure 16:
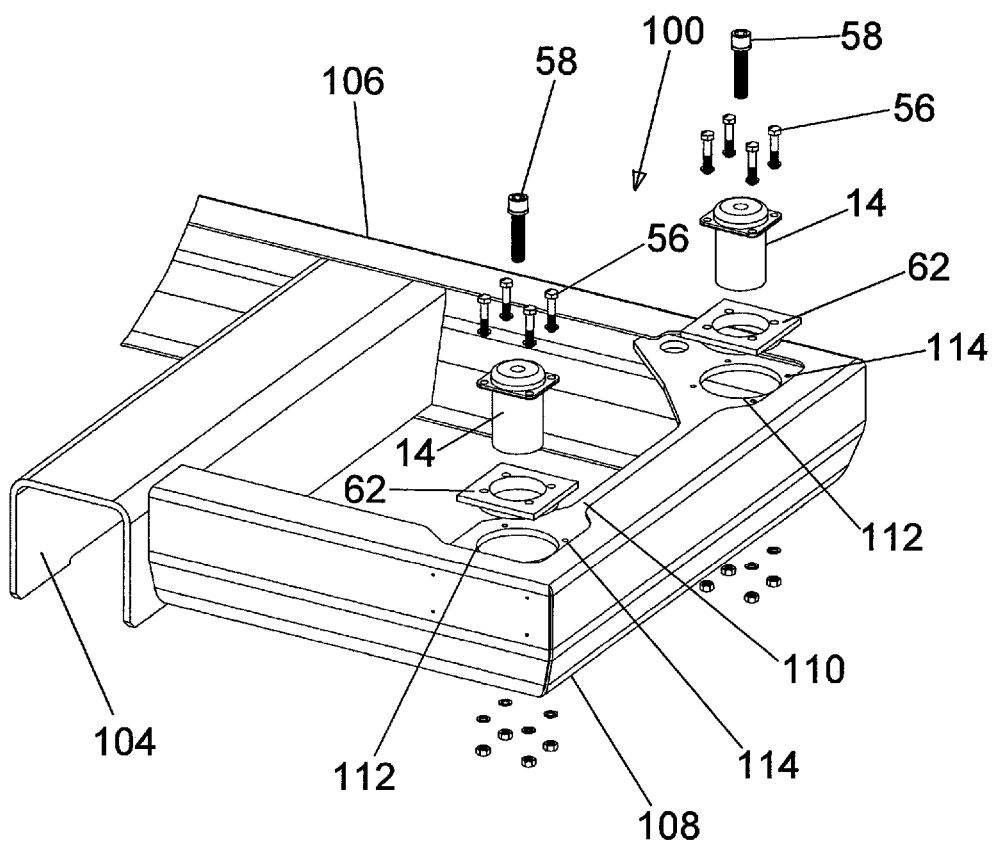
FIG. 16 is an exploded perspective view of a portion of a heavy equipment frame, which illustrates flanged isolators before installation into an isolator adapter plate of a modular saddle mount system in accordance with the present invention.
Figure 17:
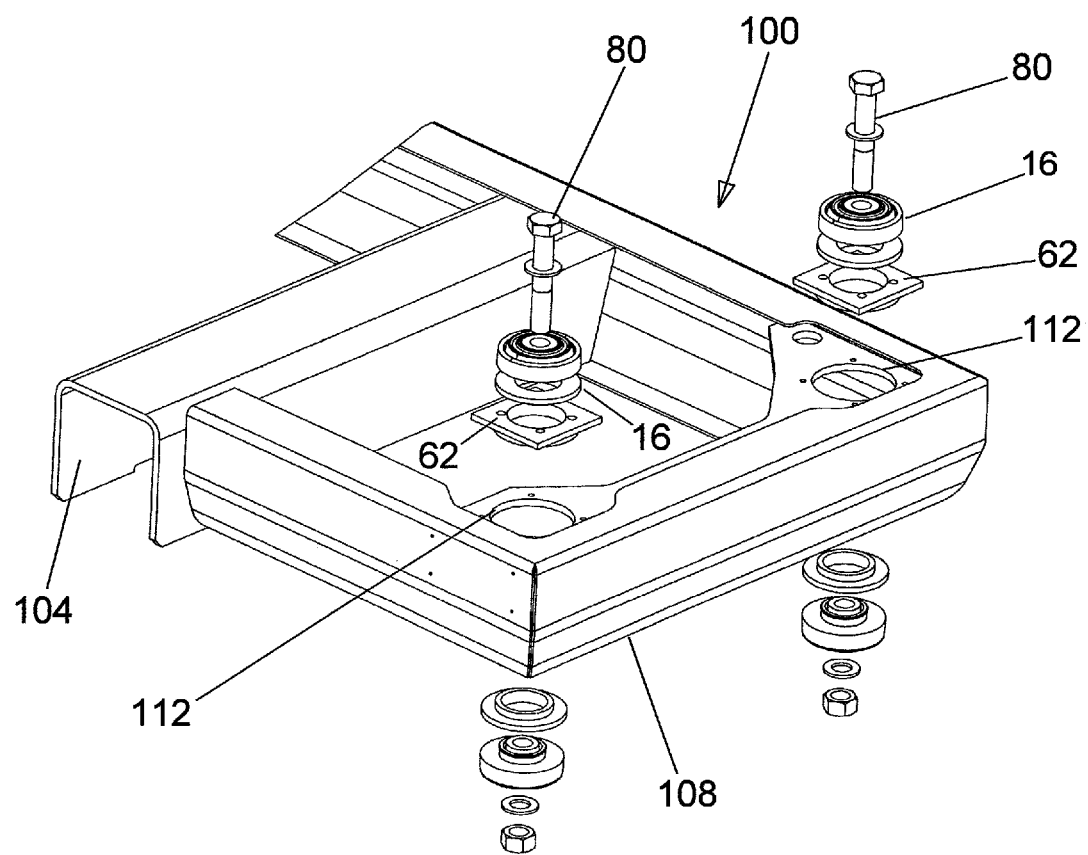
FIG. 17 is an exploded perspective view of a portion of a heavy equipment frame, which illustrates non-flanged through-bolt isolators before installation into a cab mounting plate of the modular saddle mount system in accordance with the present invention.

With reference to FIG. 16, a plurality of threaded taps 114 are formed around each insert opening 112. A vibration isolator 14 is inserted into each insert opening 112 and secured to the isolator mounting plate 110 through the isolator adapter insert 62 with a plurality of threaded fasteners 56. One end of the cab 102 is secured to the two vibration isolators 14 with two cab fasteners 58. With reference to FIG. 17, a vibration isolator 16 is inserted into each insert opening 112 and through the isolator adapter insert 62. The two vibration isolators 16 and the cab 102 are secured to the isolator mounting plate 110 with two cab retention bolts 80. Isolator adapter inserts 62 with the same location boss size 65, but with different size isolator openings 64 would allow the isolator adapter insert 62 to be replaced without having the need for multiple isolator mounting plates 110 with different size isolator openings 112. However, four modular saddle mounts 12 could be used to support each corner of the cab 102.

Figure 18:
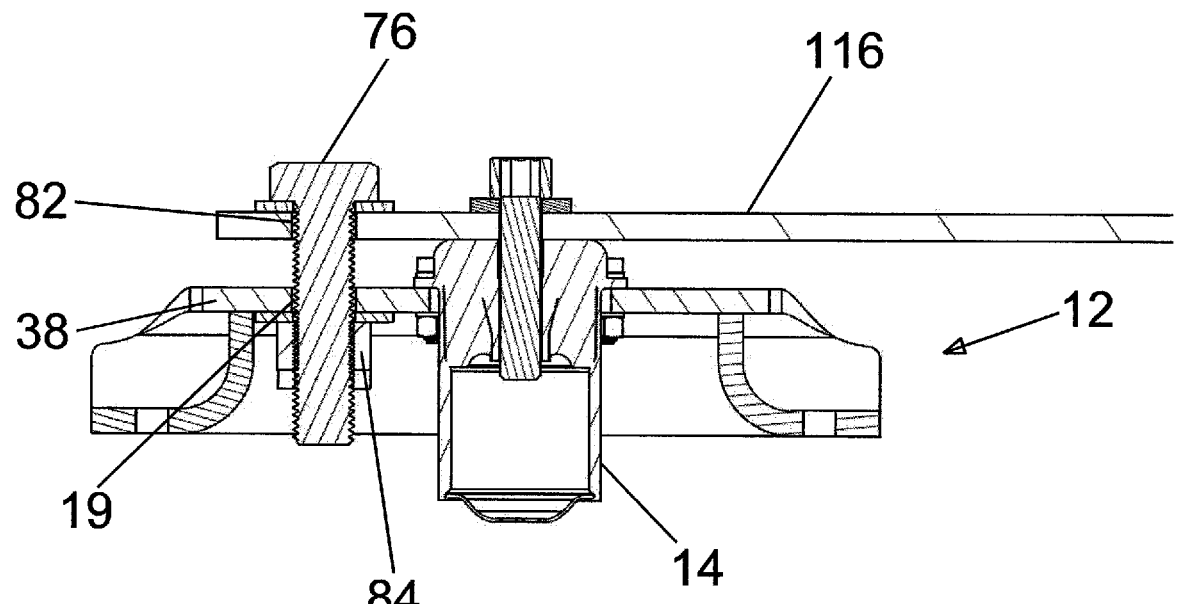
FIG. 18 is a cross sectional view of a secondary retention device as a bolt inserted through a cab floor and a modular saddle mount and retained with a nut threaded on to the bolt in accordance with the present invention.
Figure 19:
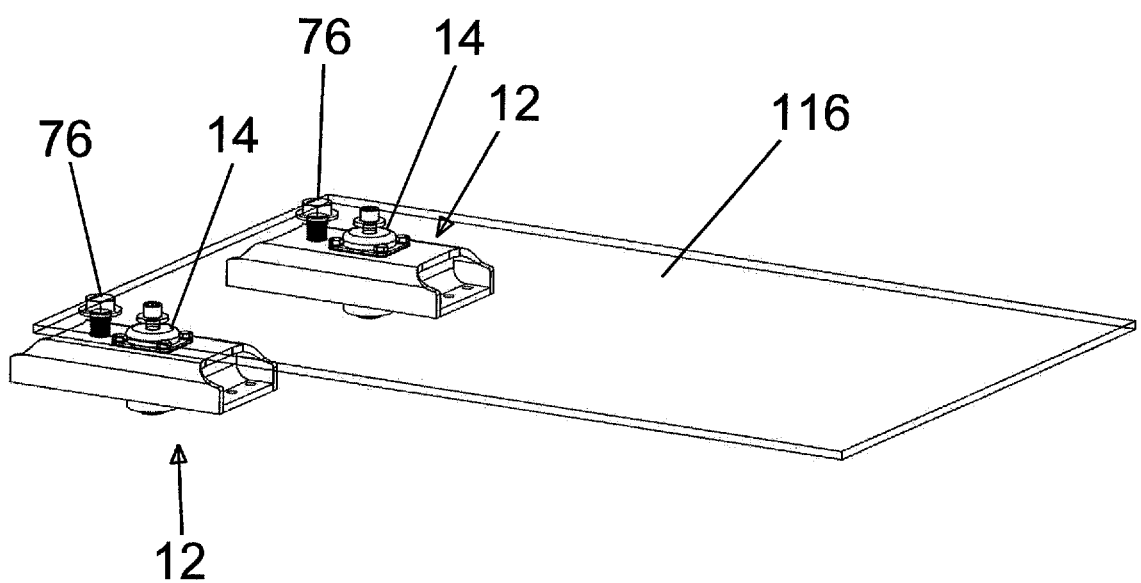
FIG. 19 is a perspective view of a secondary retention device as a bolt inserted through a cab floor and a modular saddle mount and retained with a nut threaded on to the bolt in accordance with the present invention.

Secondary retention devices prevent a heavy equipment cab from separating from a frame during a roll-over event. With reference to FIGS. 18-19, a secondary retention device Preferably includes the retention bolt 76 inserted through a bolt hole 82 in a cab floor 116 and a bolt hole 19 in the top saddle member 38 of the modular saddle mount 12. The vibration isolator 14 is retained in the modular saddle mount 12. The cab floor 116 is secured to the vibration isolator with the bolt 58. A retention nut 84 is threaded on to the retention bolt 76 to prevent the cab floor 116 from separating from the modular saddle mount 12 during a roll-over event.

Figure 20:
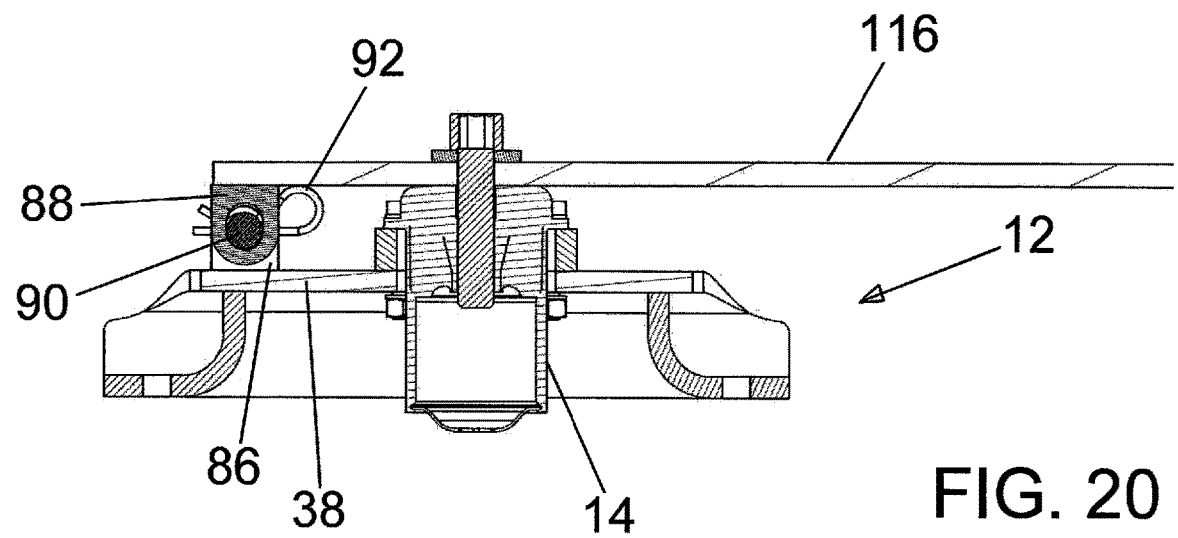
FIG. 20 is a cross sectional view of a first alternative of a secondary retention device utilizing a yoke extending upward from a modular saddle mount, an extension plate extending downward from a bottom of a cab floor and a lock pin inserted through the yoke and extension plate in accordance with the present invention.
Figure 21:
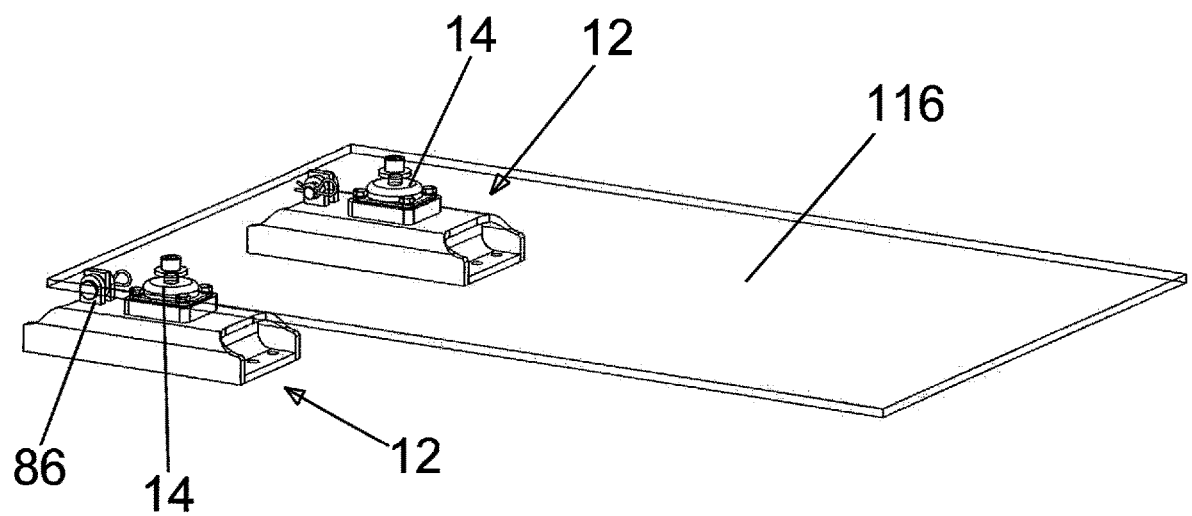
FIG. 21 is a perspective view of a first alternative of a secondary retention device utilizing a yoke extending upward from a modular saddle mount, an extension plate extending downward from a bottom of a cab floor and a lock pin inserted through the yoke and extension plate in accordance with the present invention.

With reference to FIGS. 20-21, a first alternative of a secondary retention device includes a yoke 86 extending upward from the top saddle member 38 of the modular saddle mount 12, an extension plate 88 extending downward from a bottom of the cab floor 116 and a lock pin 90. The vibration isolator 14 is retained in the modular saddle mount 12. The cab floor 116 is secured to the vibration isolator with the bolt 58. The lock pin 90 is inserted through the yoke 86 and the extension plate 88 and the lock pin 90 retained in place with a lock clip 92. However, the lock pin 90 and the lock clip 92 could be replaced with a threaded fastener and a nut or any other suitable retention device.

Figure 22:
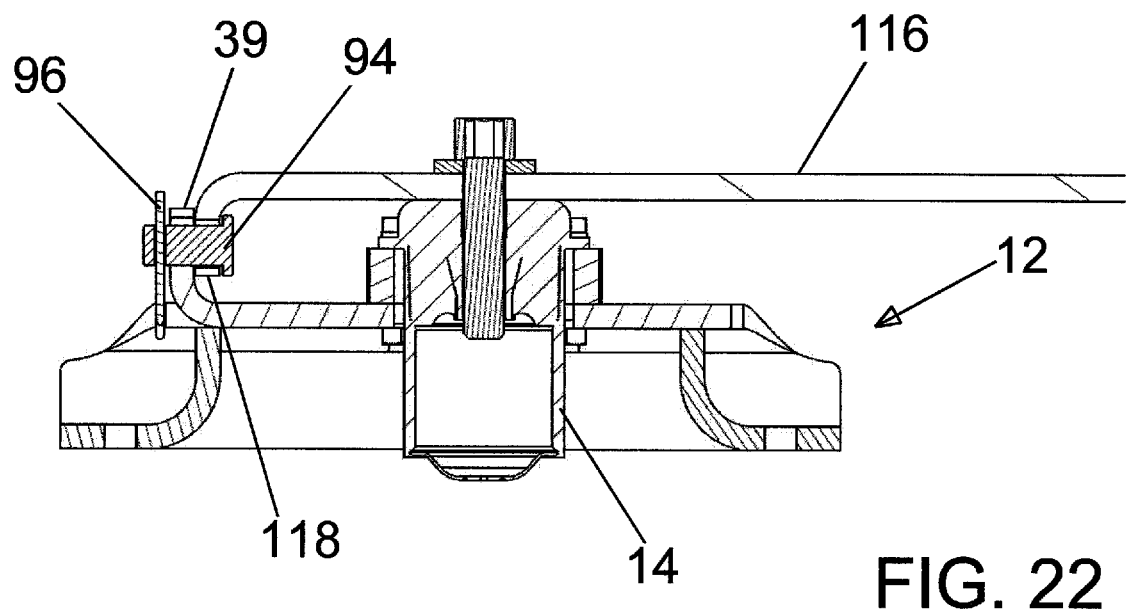
FIG. 22 is a cross sectional view of a second alternative of a secondary retention device utilizing a bent over edge of a cab floor, a bent-up edge of a modular saddle mount and a lock pin inserted through the bent over cab floor and the bent-up modular saddle mount in accordance with the present invention.
Figure 23:
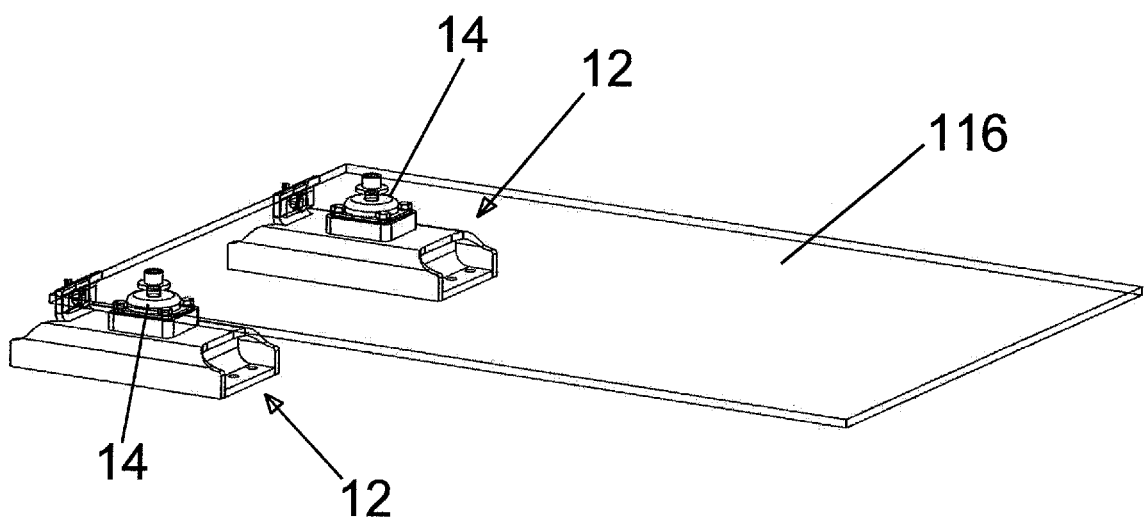
FIG. 23 is a perspective view of a second alternative of a secondary retention device utilizing a bent over edge of a cab floor, a bent-up edge of a modular saddle mount and a lock pin inserted through the bent over cab floor and the bent-up edge of the modular saddle mount in accordance with the present invention.

With reference to FIGS. 22-23, a second alternative of a secondary retention device includes a bent over edge 118 of the cab floor 16, a bent-up edge 39 of the top saddle member 38 of the modular saddle mount 12 and a lock pin 94. The vibration isolator 14 is retained in the modular saddle mount 12. The cab floor 116 is secured to the vibration isolator with the bolt 58. The lock pin 94 is inserted through the bent over cab floor 118 and the bent-up edge 39 of the top saddle member 38 of the modular saddle mount 12. An end of the bent-up 39 includes a vertical orientation. An end of the bent over edge 118 includes a vertical orientation. The lock pin 94 is held in place with a lock clip 96. However, the lock pin 94 and the lock clip 96 could be replaced with a threaded fastener and a nut or any other suitable retention device.

Figure 24:
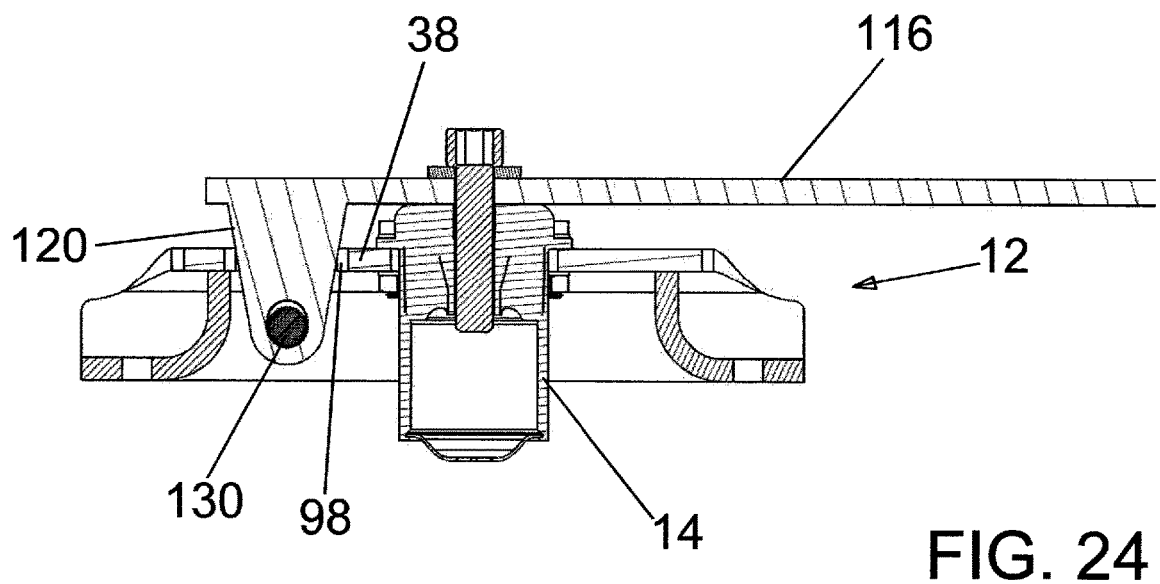
FIG. 24 is a cross sectional view of a third alternative of a secondary retention device utilizing a retention plate extending downward from a cab floor, a slot opening formed through a modular saddle mount to receive the retention plate and a fastener inserted through the retention plate and a side wall of the modular saddle mount in accordance with the present invention.
Figure 25:
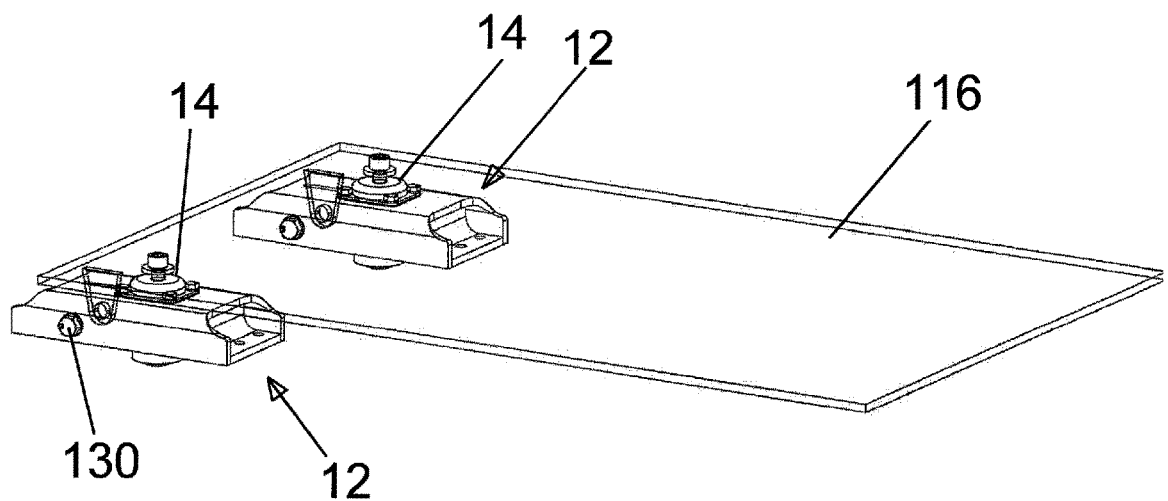
FIG. 25 is a perspective view of a third alternative of a secondary retention device utilizing a retention plate extending downward from an edge of cab floor, a slot opening formed through a modular saddle mount to receive the retention plate and a fastener inserted through the retention plate and a side wall of the modular saddle mount in accordance with the present invention.

With reference to FIGS. 24-25, a third alternative of a secondary retention device includes a retention plate 120 extending downward from an edge of the cab floor 116, a slot opening 98 formed through the top saddle member 38 of the modular saddle mount 12 to receive the retention plate 120 and a fastener 130 inserted through the retention plate 120 and a side of the top saddle member 38 of the modular saddle mount 12. The vibration isolator 14 is retained in the modular saddle mount 12. The cab floor 116 is secured to the vibration isolator with the bolt 58. A nut (not shown) is preferably threaded on to the fastener 130 to retain the fastener 130 in place. However, the fastener 130 and the nut may be replaced with a lock pin and a lock clip or any other suitable retention device.

Figure 26:
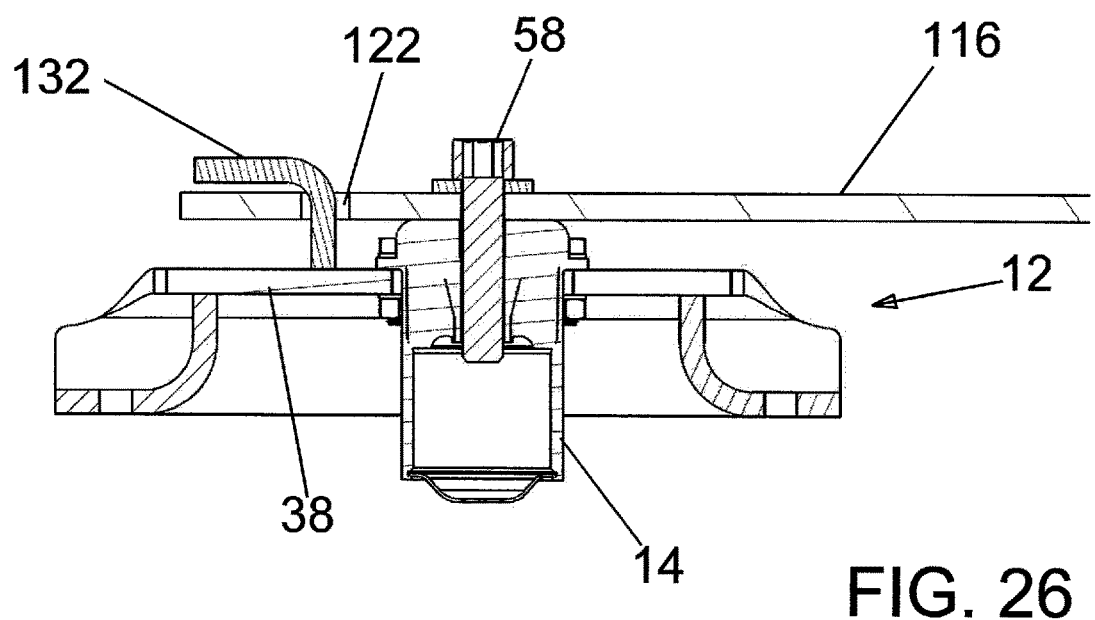
FIG. 26 is a cross sectional view of a fourth alternative of a secondary retention device utilizing a curved tab extending upward from a modular saddle mount and a slot opening formed through a cab floor to receive the curved tab in accordance with the present invention.
Figure 27:
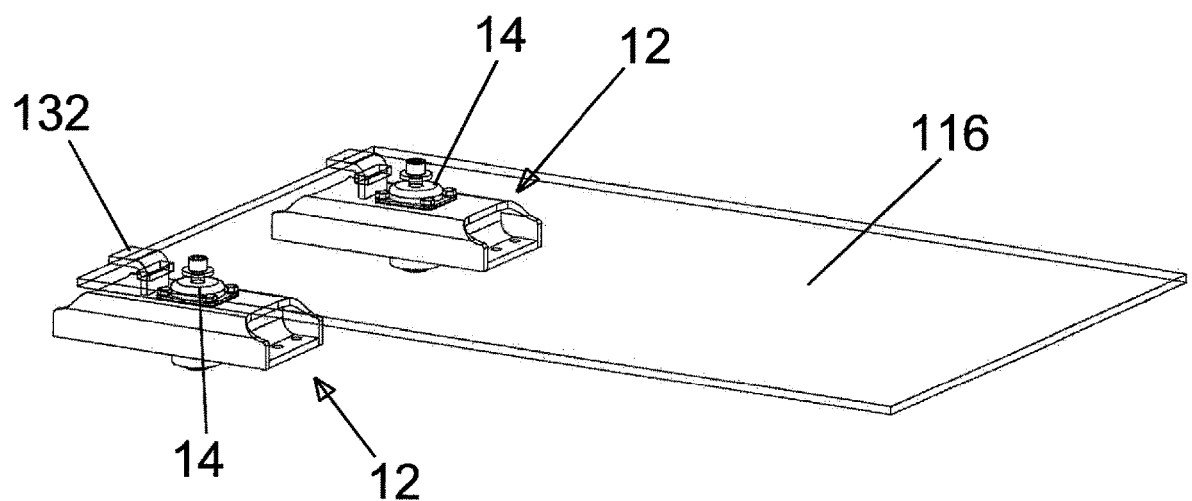
FIG. 27 is a perspective view of a fourth alternative of a secondary retention device utilizing a curved tab extending upward from a modular saddle mount and a slot opening formed through a cab floor to receive the curved tab in accordance with the present invention.

With reference to FIGS. 26-27, a fourth alternative of a secondary retention device includes a curved tab 132 extending upward from the top saddle member 38 of the modular saddle mount 12 and a slot opening 122 formed through the cab floor 116 to receive the curved tab 132. The vibration isolator 14 is retained in the modular saddle mount 12. An end of the curved tab 132 has a horizontal orientation. The curved tab 132 is inserted through the slot opening 122 and the isolator bolt 58 secured to the vibration isolator 14 in the modular saddle mount 12.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A secondary retention device for retaining a heavy equipment cab on a frame with a modular saddle mount, comprising:
a retention device;
a floor edge of a cab floor of the heavy equipment cab is bent downward to a vertical orientation, a floor opening is formed through said floor edge to receive said retention device;
a saddle edge of the modular saddle mount is bent upward to a vertical orientation, a saddle opening is formed through said saddle edge to receive said retention device, wherein said retention device is configured to be inserted through said floor opening and said saddle opening to prevent separation of the heavy equipment cab from the modular saddle mount.

2. The secondary retention device of claim 1 wherein: said retention device is a lock pin with a lock clip.

3. The secondary retention device of claim 1 wherein: said retention device is a threaded fastener and a nut.

4. The secondary retention device of claim 1 wherein:
a vibration isolator is retained in the modular saddle mount; and
a fastener is used to secure the cab floor to the vibration isolator.

5. A secondary retention device for retaining a heavy equipment cab on a frame with a modular saddle mount, comprising:
a retention device is a lock pin with a lock clip;
an extension plate extending downward from a bottom of a cab floor of the heavy equipment cab, a retention opening is formed through said extension plate to receive said retention device; and
a plate opening is formed through a top of the modular saddle mount to receive said extension plate, wherein said retention device is configured to be inserted through said retention opening to prevent a separation of the heavy equipment cab from the modular saddle mount.

6. The secondary retention device of claim 5 wherein:
a vibration isolator is retained in the modular saddle mount; and
a fastener is used to secure the cab floor to the vibration isolator.

7. A secondary retention device for retaining a heavy equipment cab on a frame with a modular saddle mount, comprising:
a curved tab extends upward from a top of the modular saddle mount, an end of said curved tab has a horizontal orientation; and
a tab opening is formed through a cab floor of the heavy equipment cab to receive said curved tab, wherein said curved tab is configured to be inserted through the cab floor to prevent a separation of the heavy equipment cab from the modular saddle mount.

8. The secondary retention device of claim 7 wherein:
a vibration isolator is retained in the modular saddle mount; and
a fastener is used to secure the cab floor to the vibration isolator.

9. A secondary retention device for retaining a heavy equipment cab on a frame with a modular saddle mount, comprising:
a retention device is a threaded fastener and a nut;
an extension plate extending downward from a bottom of a cab floor of the heavy equipment cab, a retention opening is formed through said extension plate to receive said retention device; and
a plate opening is formed through a top of the modular saddle mount to receive said extension plate, wherein said retention device is configured to be inserted through said retention opening to prevent a separation of the heavy equipment cab from the modular saddle mount.

10. The secondary retention device of claim 9 wherein:
a vibration isolator is retained in the modular saddle mount; and
a fastener is used to secure the cab floor to the vibration isolator.

* * * * *